(12) United States Patent
Jägenstedt et al.

(10) Patent No.: US 10,858,041 B2
(45) Date of Patent: Dec. 8, 2020

(54) ALL WHEEL DRIVE ROBOTIC VEHICLE WITH STEERING BRAKE

(71) Applicant: HUSQVARNA AB, Huskvarna (SE)

(72) Inventors: Patrik Jägenstedt, Tenhult (SE);
Fredrik Kallström, Huskvarna (SE);
Magnus Bergenholm, Flisby (SE);
Mats Svensson, Huskvarna (SE);
Magnus Öhrlund, Malmbäck (SE);
Mattias Kamfors, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 15 days.

(21) Appl. No.: 16/286,751

(22) Filed: Feb. 27, 2019

(65) Prior Publication Data
US 2019/0256138 A1    Aug. 22, 2019

Related U.S. Application Data

(63) Continuation of application No. 15/532,591, filed as application No. PCT/IB2015/059129 on Nov. 25, 2015, now Pat. No. 10,259,498.
(Continued)

(51) Int. Cl.
*B62D 12/00* (2006.01)
*A01D 34/00* (2006.01)
(Continued)

(52) U.S. Cl.
CPC ........... *B62D 12/00* (2013.01); *A01D 34/008* (2013.01); *B62D 53/02* (2013.01); *B62D 63/02* (2013.01);
(Continued)

(58) Field of Classification Search
CPC ........ B62D 12/00; B62D 53/02; B62D 63/02; B62D 3/04; A01D 34/008; F16D 65/18; B60L 7/24
See application file for complete search history.

(56) References Cited

U.S. PATENT DOCUMENTS 2,451,589 A   10/1948   Thomas
3,128,840 A    4/1964   Barrett, Jr.
(Continued)

FOREIGN PATENT DOCUMENTS

CN    201938070 U    8/2011
CN    202077380 U   12/2011
(Continued)

OTHER PUBLICATIONS

International Search Report and Written Opinion for International Application No. PCT/SE2017/050773 dated Oct. 10, 2017.
(Continued)

*Primary Examiner* — Kevin Hurley
*Assistant Examiner* — Marlon A Arce
(74) *Attorney, Agent, or Firm* — Burr & Forman, LLP

(57) ABSTRACT

A robotic vehicle may include a first chassis platform including a first wheel assembly, a second chassis platform including a second wheel assembly where the first and second chassis platforms are spaced apart from each other, and a combination linkage operably coupling the first and second chassis platforms. The combination linkage may be operably coupled to the first chassis platform via a first link and is operably coupled to the second chassis platform via a second link. The combination linkage employs at least two different coupling features to operably couple the first and second chassis platforms. The at least two different coupling features include at least any two among a fixed attachment, an attachment that enables rotation about a turning axis, and an attachment that enables pivoting about a pivot axis that is substantially perpendicular to the turning axis.

19 Claims, 28 Drawing Sheets

Related U.S. Application Data

(60) Provisional application No. 62/170,735, filed on Jun. 4, 2015, provisional application No. 62/086,498, filed on Dec. 2, 2014.

(51) Int. Cl.
    *B62D 63/02*     (2006.01)
    *B62D 53/02*     (2006.01)
    *B62D 63/04*     (2006.01)
    *F16D 65/18*     (2006.01)
    *B60L 7/24*     (2006.01)
    *F16D 121/20*     (2012.01)

(52) U.S. Cl.
    CPC ............ *B62D 63/04* (2013.01); *F16D 65/18* (2013.01); *B60L 7/24* (2013.01); *F16D 2121/20* (2013.01)

(56) References Cited

U.S. PATENT DOCUMENTS

| | | |
|---|---|---|
| 3,273,664 A | 9/1966 | Ramer |
| 3,415,335 A | 12/1968 | Wise |
| 3,426,720 A | 2/1969 | Enos |
| 3,550,714 A | 12/1970 | Bellinger |
| 3,566,988 A | 3/1971 | Wise |
| 4,079,955 A | 3/1978 | Thorpe et al. |
| 4,318,266 A | 3/1982 | Taube |
| 4,469,347 A | 9/1984 | Gier |
| 4,545,453 A | 10/1985 | Yoshimura et al. |
| 5,711,139 A | 1/1998 | Swanson |
| 6,046,565 A | 4/2000 | Throne |
| 6,089,341 A | 7/2000 | Gingerich |
| 7,047,712 B1 | 5/2006 | Hunt et al. |
| 7,631,714 B2 | 12/2009 | Dower |
| 7,784,812 B1 | 8/2010 | Lares |
| 9,043,953 B2 | 6/2015 | Sandin et al. |
| 9,085,302 B2 | 7/2015 | Borroni-Bird et al. |
| 9,258,942 B2 | 2/2016 | Biber et al. |
| 9,267,245 B1 | 2/2016 | Braun |
| 9,403,566 B2 | 8/2016 | Jacobsen et al. |
| 2003/0144774 A1 | 7/2003 | Trissel et al. |
| 2005/0029025 A1 | 2/2005 | Medina |
| 2010/0084230 A1 | 4/2010 | Yamasaki et al. |
| 2012/0273284 A1 | 11/2012 | Nesnas et al. |
| 2013/0333342 A1 | 12/2013 | Keski-Luopa et al. |
| 2014/0354096 A1 | 12/2014 | Eriksen |
| 2015/0185733 A1 | 7/2015 | Jagenstedt et al. |
| 2015/0201555 A1 | 7/2015 | Inilgert |
| 2019/0357433 A1* | 11/2019 | Fuse .................... A01D 34/74 |
| 2019/0378360 A1* | 12/2019 | Bergenholm ............ G07C 5/02 |

FOREIGN PATENT DOCUMENTS

| | | |
|---|---|---|
| CN | 103283376 A | 9/2013 |
| CN | 203482619 U | 3/2014 |
| EP | 0 716 974 A1 | 6/1996 |
| EP | 2 073 088 B1 | 6/2011 |
| EP | 2869688 B1 | 4/2018 |
| FR | 3 022 209 A1 | 12/2015 |
| JP | H09-37610 A | 2/1997 |
| JP | 2015-168395 A | 9/2015 |
| JP | 2016-148937 A | 8/2016 |
| JP | 5973608 B1 | 8/2016 |
| JP | 5973609 B1 | 8/2016 |
| JP | 5973610 B1 | 8/2016 |
| JP | 6014182 B2 | 10/2016 |
| WO | 90/04821 A1 | 5/1990 |
| WO | 96/02454 A1 | 2/1996 |
| WO | 02/36412 A1 | 5/2002 |
| WO | 02/45915 A1 | 6/2002 |
| WO | 2014/007729 A1 | 1/2014 |
| WO | 2015/115954 A1 | 8/2015 |
| WO | 2016/087998 A2 | 6/2016 |
| WO | 2016/097896 A1 | 6/2016 |
| WO | 2016/102146 A1 | 6/2016 |
| WO | 2016/103070 A1 | 6/2016 |
| WO | 2016/150510 A1 | 9/2016 |

OTHER PUBLICATIONS

International Search Report and Written Opinion for International Application No. PCT/IB2015/059129 dated May 30, 2016.

International Preliminary Report on Patentability for International Application No. PCT/IB2015/059129 dated Jun. 6, 2017.

Xuyong Tu, "Robust navigation control and headland turning optimization of agricultural vehicles", 2013, p. 27, http://lib.dr.iastate.edu/cgi/viewcontent.cgi?article=4195&context=etd, all enclosed pages cited.

International Preliminary Report on Patentability for International Application No. PCT/SE2017/050773 dated Jan. 15, 2019.

Ambrogio Robot, "L60 B", http://www.ambrogiorobot.com/en/models/view/l60-b, Nov. 15, 2016, all enclosed pages cited.

Ambrogio Robot, "L200R B", http://www.ambrogiorobot.com/en/models/view/l200r-b, Nov. 15, 2016, all enclosed pages cited.

FLYMO, "FLYMO Robotic Lawnmower 1200R", http://www.flymo.com/uk/lawn-mowers/robotic/1200r/, Nov. 15, 2016, all enclosed pages cited.

\* cited by examiner

ALL WHEEL DRIVE ROBOTIC VEHICLE WITH STEERING BRAKE

CROSS REFERENCE TO RELATED APPLICATIONS

This application is a continuation of U.S. application Ser. No. 15/532,591 filed Jun. 2, 2017, which is a national phase entry of international Application No. PCT/IB2015/059129 filed Nov. 25, 2015, which claims the benefit of U.S. Provisional Application No. 62/086,498 filed on Dec. 2, 2014 and U.S. Provisional Application No. 62/170,735 filed on Jun. 4, 2015, the entire contents of each are hereby incorporated herein by reference. Claims the benefit of U.S. Provisional Application No. 62/086,498 filed on Dec. 2, 2014 and U.S. Provisional Application No. 62/170,735 filed on Jun. 4, 2015, the entire contents of each are hereby incorporated herein by reference.

TECHNICAL FIELD

Example embodiments generally relate to robotic vehicles and, more particularly, relate to a robotic vehicle with a steering brake.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

Robotic mowers are typically capable of transiting over even and uneven terrain to execute yard maintenance activities relating to mowing. They may be programmed to stay within a defined area while performing their mowing tasks, and may even be configured to perform other tasks in the defined area. Thus, it may be desirable to expand the capabilities of robotic mowers to improve their utility and functionality.

BRIEF SUMMARY OF SOME EXAMPLES

Some example embodiments may therefore provide a robotic vehicle that is structured and controlled in a manner that achieves superior performance. In this regard, the robotic vehicle may have improved turning capabilities based on both its structure and the control mechanisms employed on the robotic vehicle.

Some example embodiments may improve the ability of robotic vehicles to provide utility for garden owners or other operators, specifically by enabling the garden owners to operate such vehicles in a variety of different, and even challenging environments.

Some example embodiments may provide a robotic vehicle including a first chassis platform comprising a first wheel assembly, a second chassis platform comprising a second wheel assembly, the first and second chassis platforms being spaced apart from each other, a linkage operably coupled to the first chassis platform and the second chassis platform, such that the linkage is fixed relative to the first chassis platform, and such that the second chassis platform is rotatable relative to the first chassis platform, the second chassis platform comprises a turning axis. The robotic vehicle may also include an electric brake disposed proximate to a turning shaft of the linkage, the electric brake being selectively applied by processing circuitry to resist turning of the second chassis platform about the turning axis and being selectively released to allow the second chassis platform to turn about the turning axis.

In another example embodiment, a robotic vehicle is provided which includes a first chassis platform comprising a first wheel assembly a second chassis platform comprising a second wheel assembly, the first and second chassis platforms being spaced apart from each other, a linkage operably coupled to the first chassis platform and the second chassis platform, such that the linkage is fixed relative to the first chassis platform, and such that the second chassis platform is rotatable relative to the first chassis platform. The second chassis platform comprises a turning axis. The robotic vehicle may also include an electropermanent magnet including a brake disc and an electromagnet configured to engage the brake disc when applied and disposed proximate to a turning shaft of the linkage, the electric brake being selectively applied by the processing circuitry to resist turning of the second chassis platform about the turning axis and being selectively released to allow the second chassis platform to turn about the turning axis.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 4A:
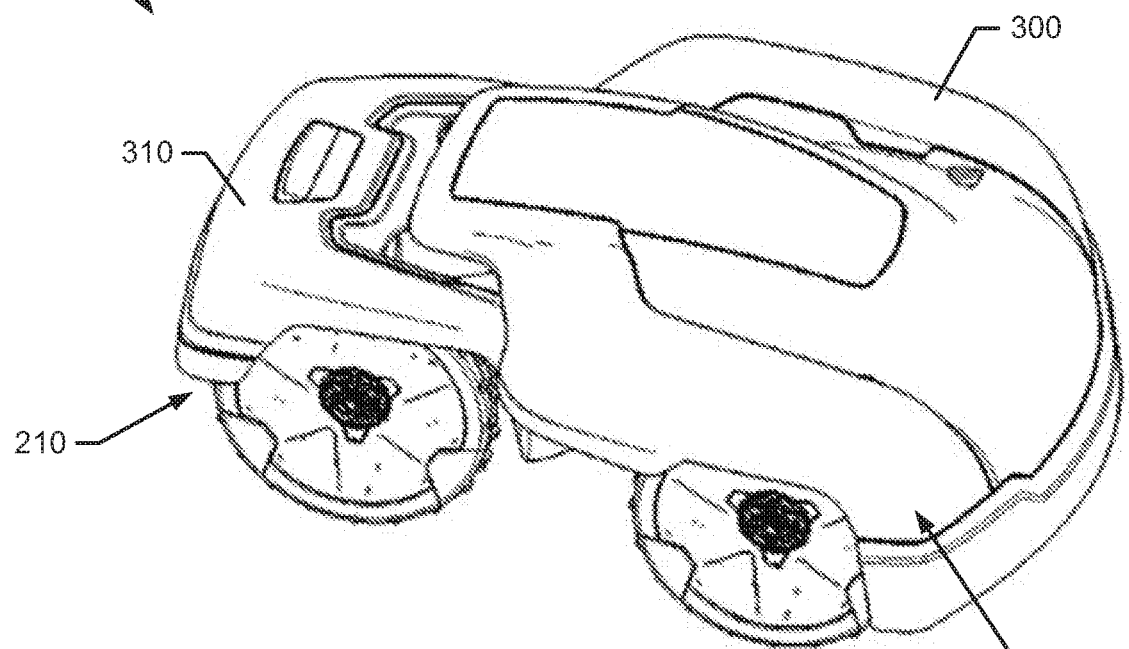
Figure 4B:
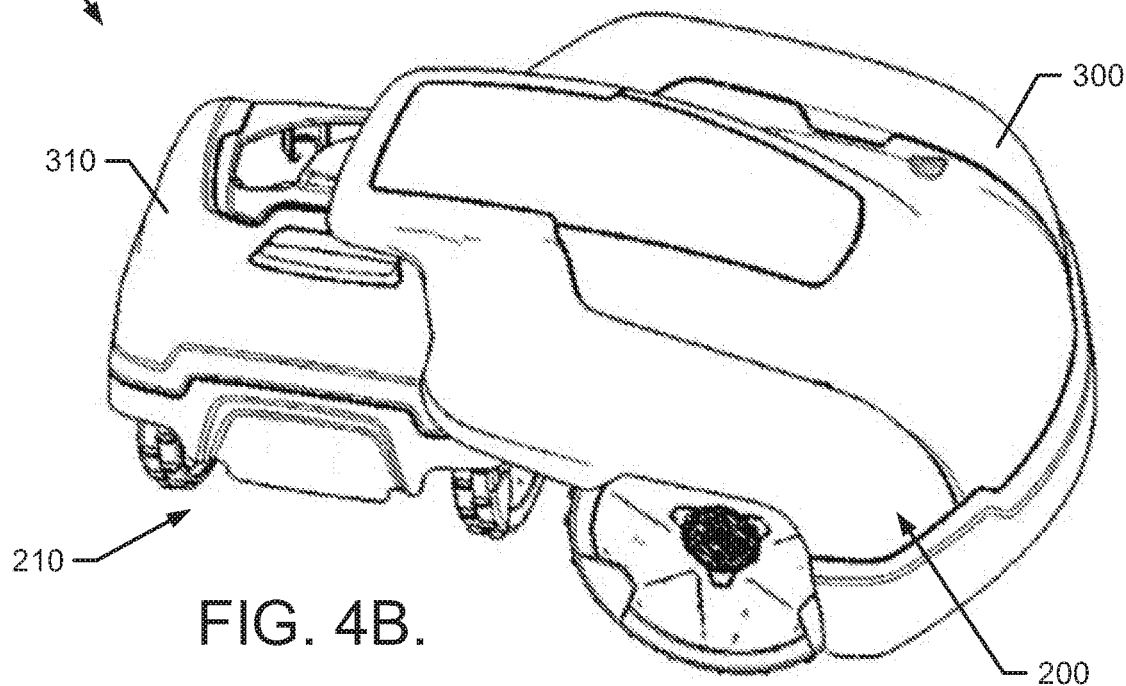
Figure 5A:
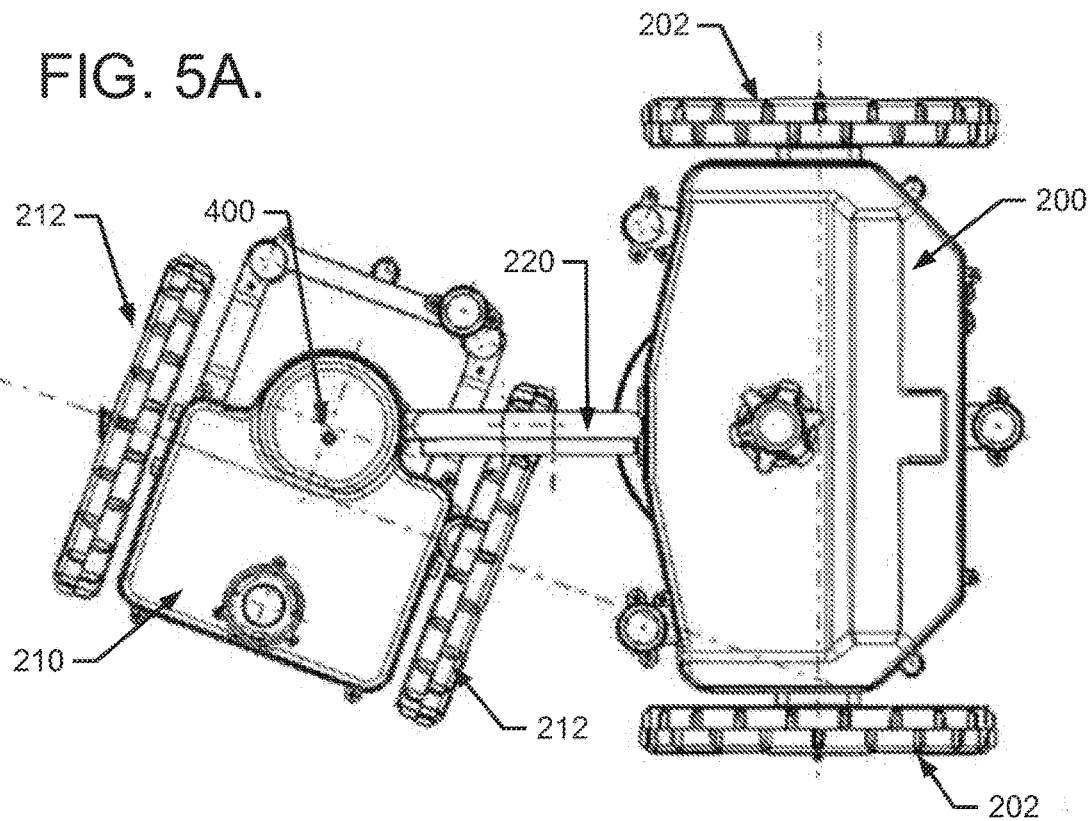
Figure 5B:
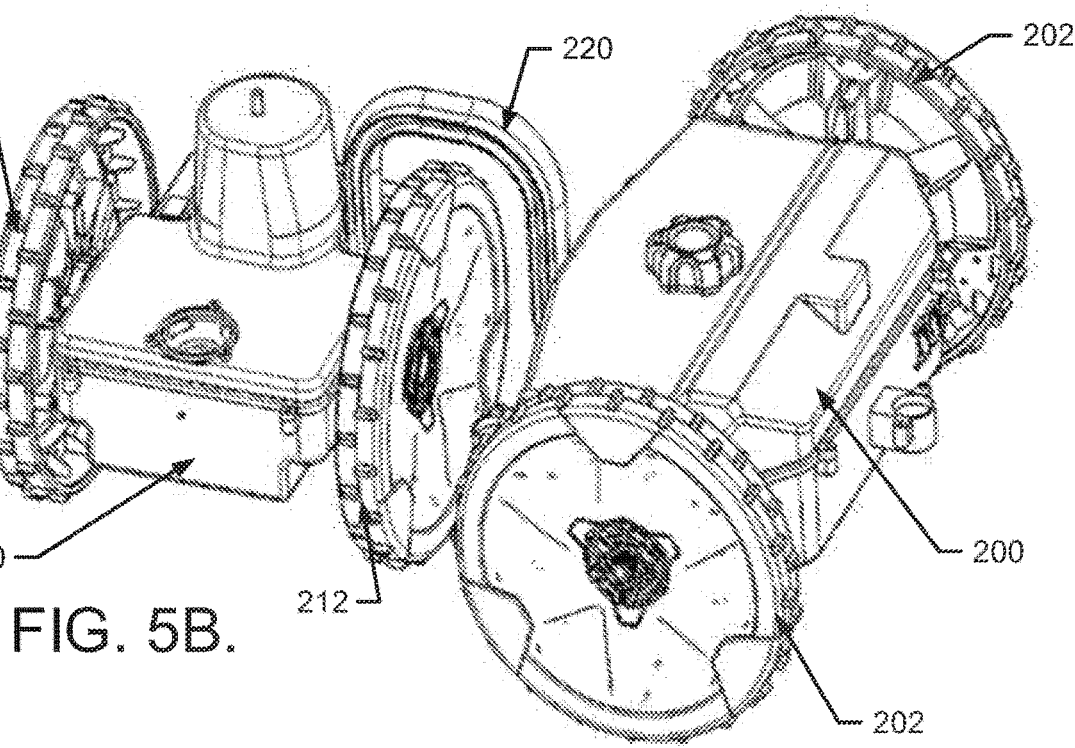
Figure 6B:
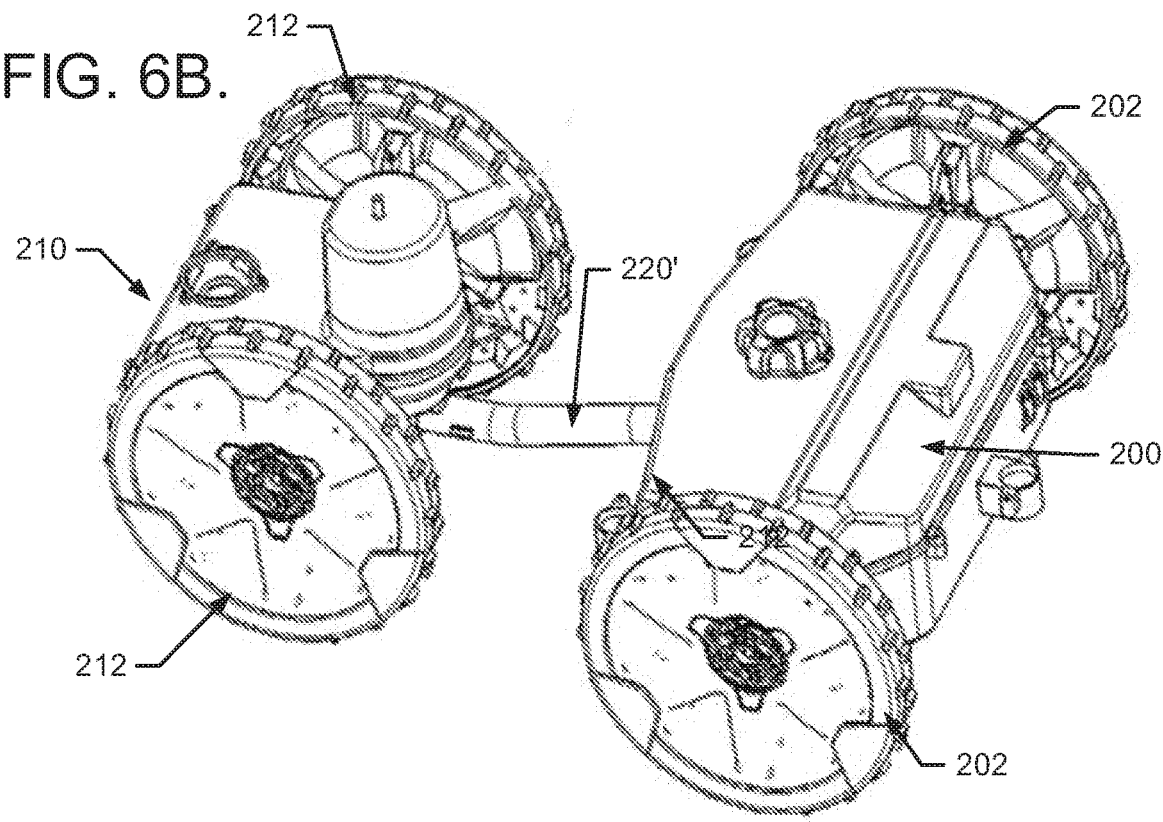
Figure 6A:
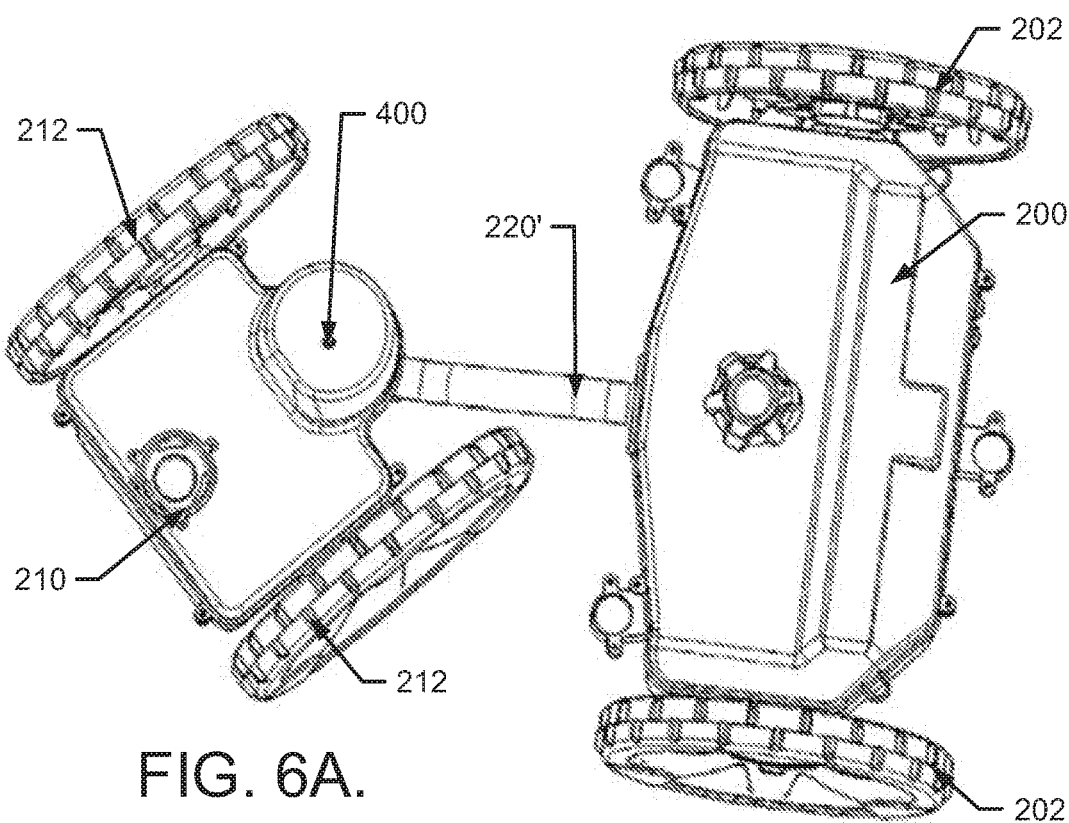
Figure 7A:
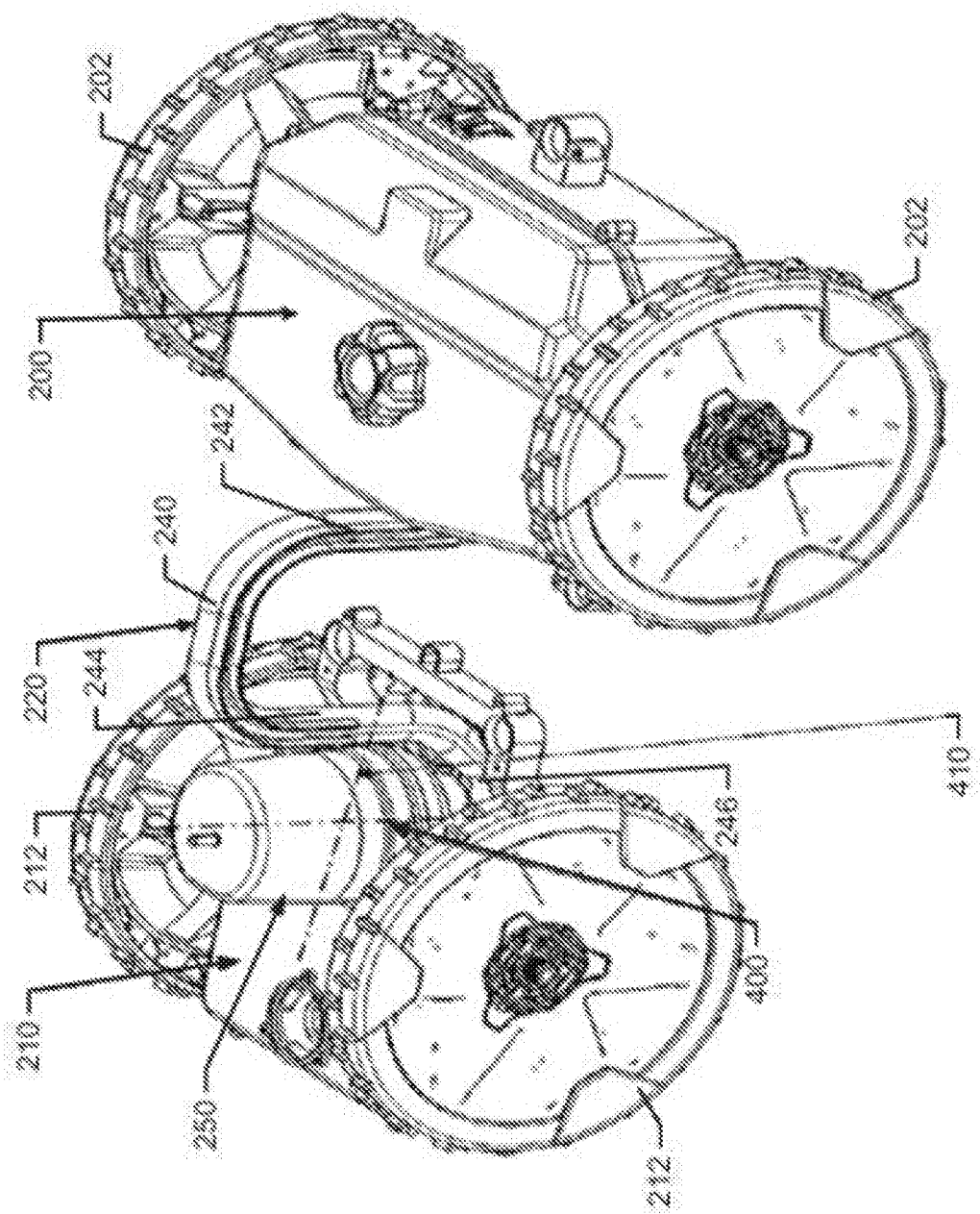
Figure 7B:

FIG. 4, which includes FIGS. 4A and 4B, illustrates a perspective view of the robotic mower in accordance with an example embodiment;

FIG. 5, which includes FIGS. 5A and 5B, illustrates various views of the robotic mower with the first and second housing portions removed to show a turning capability of one example embodiment that has a curved combination linkage between chassis platforms;

FIG. 6, which includes FIGS. 6A and 6B, illustrates various views of the robotic mower with the first and second housing portions removed to show a turning capability of one example embodiment that has a straight combination linkage between chassis platforms;

FIG. 7A illustrates the combination linkage connecting the first chassis platform to the second chassis platform in accordance with an example embodiment;

FIG. 7B illustrates an example combination linkage including two combination linkage arms according to an example embodiment.

Figure 8A:
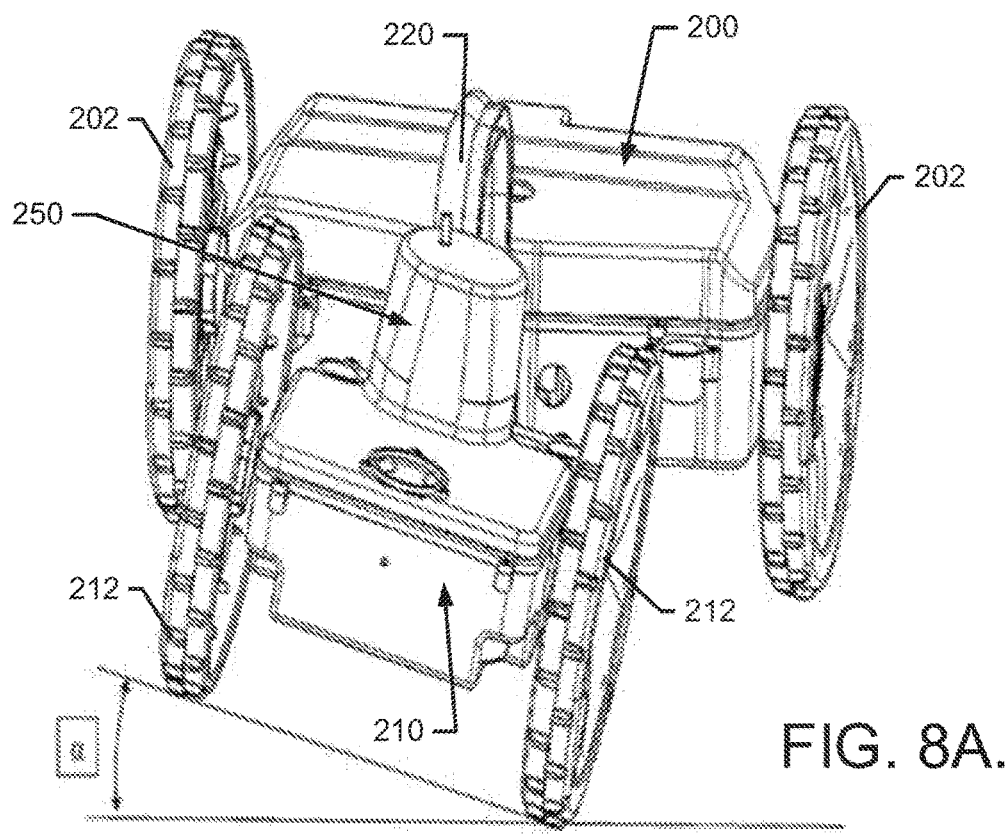
Figure 8B:
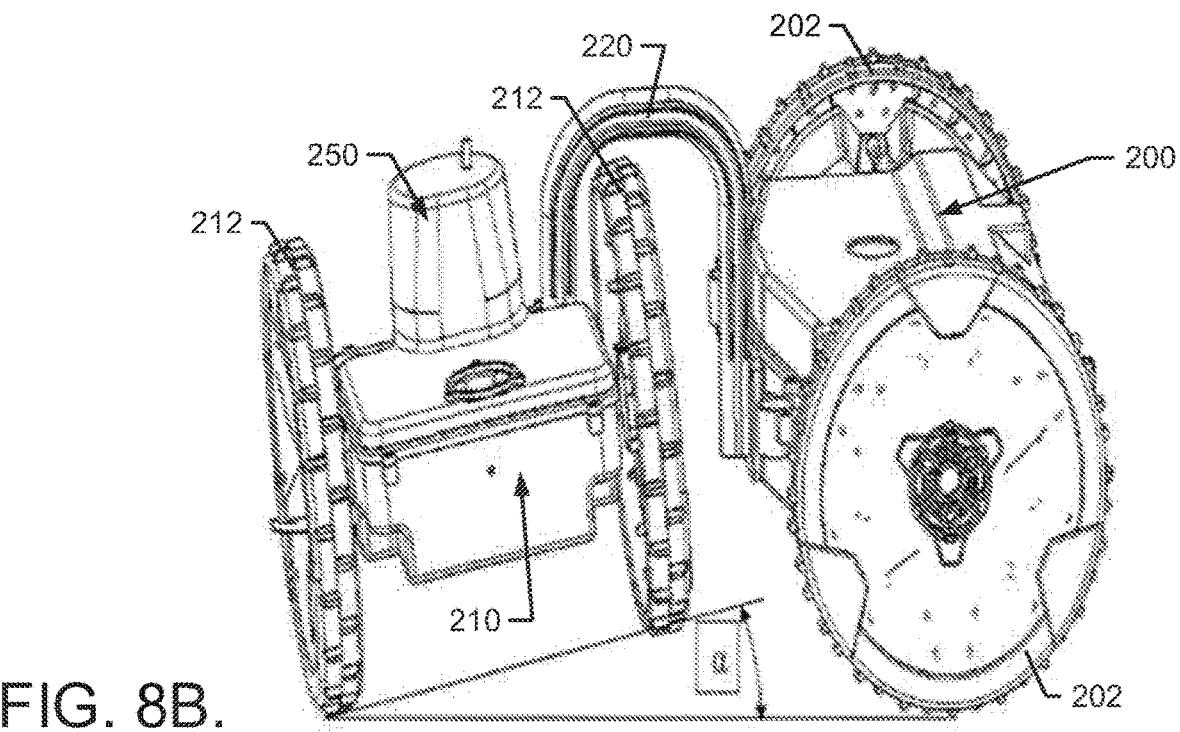
Figure 9A:
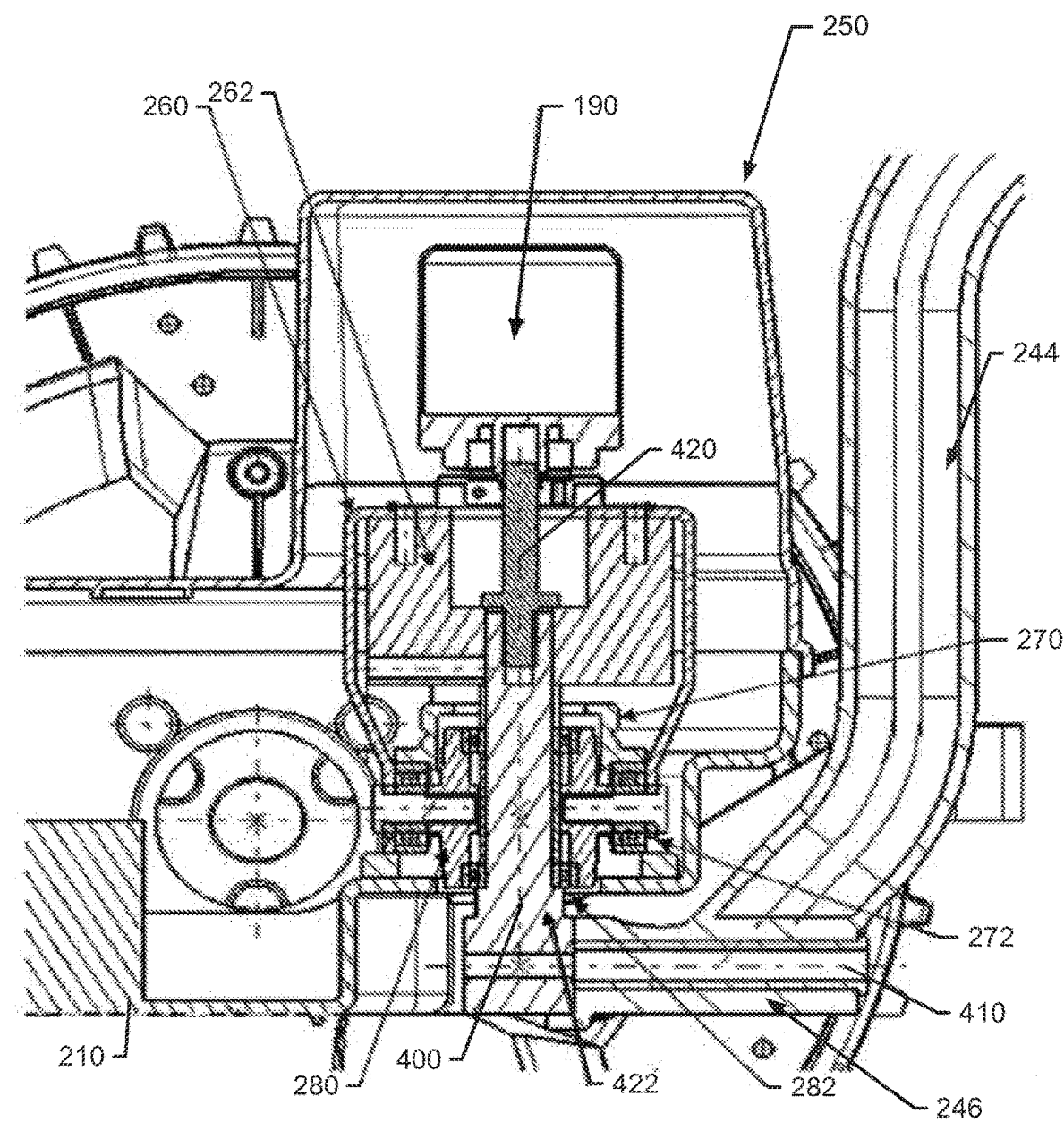
Figure 9B:
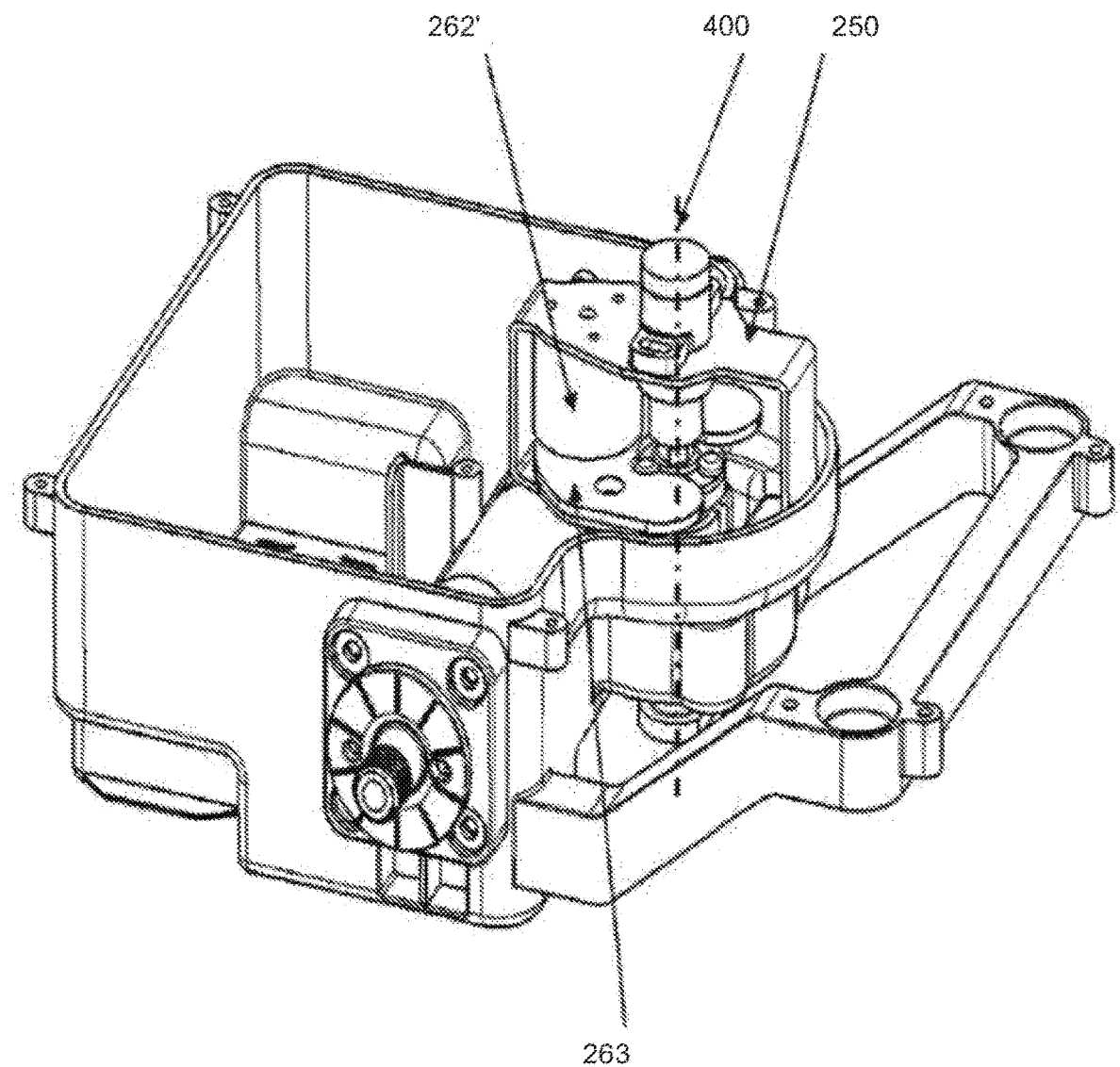
Figure 9C:
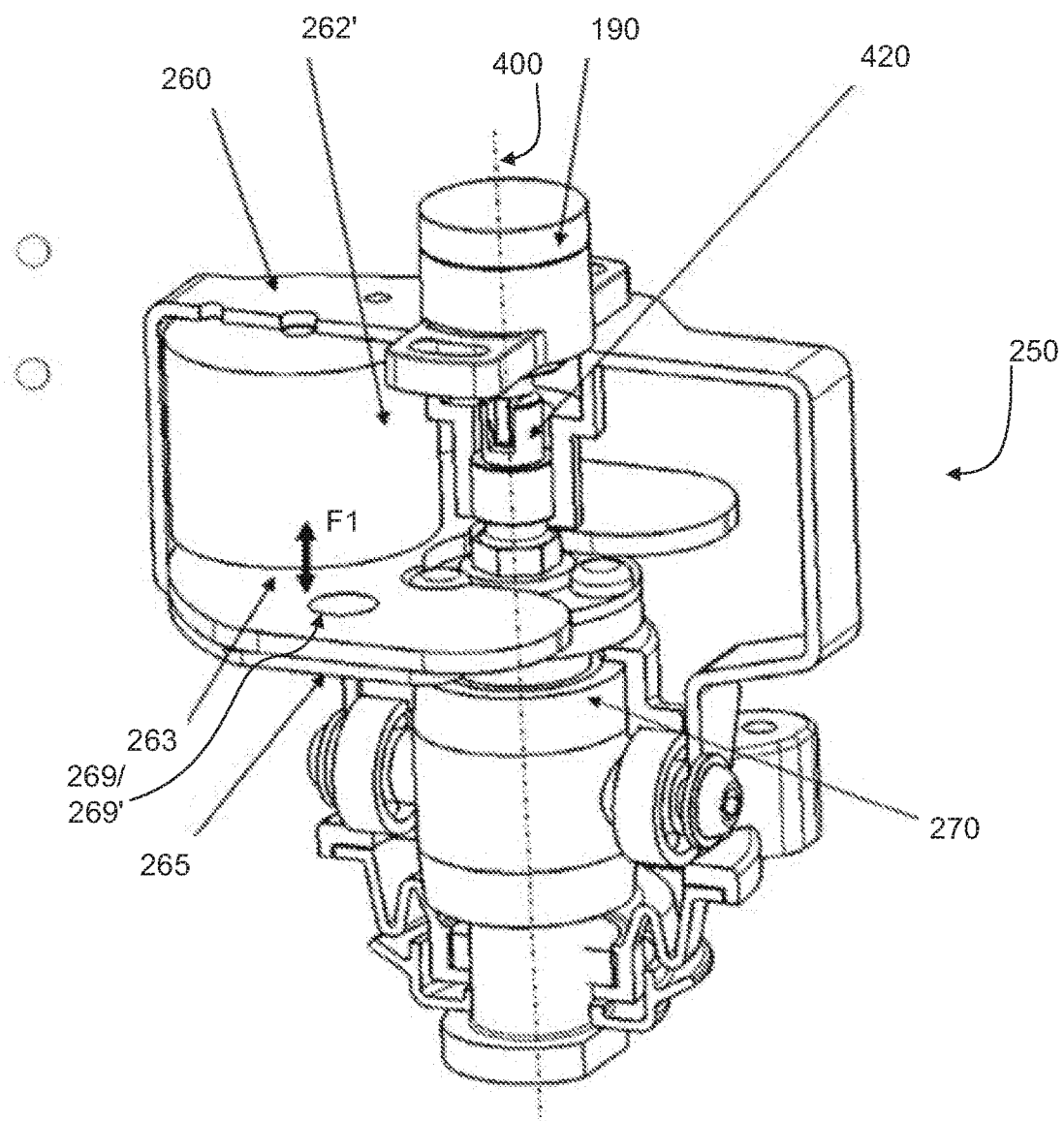
Figure 9D:
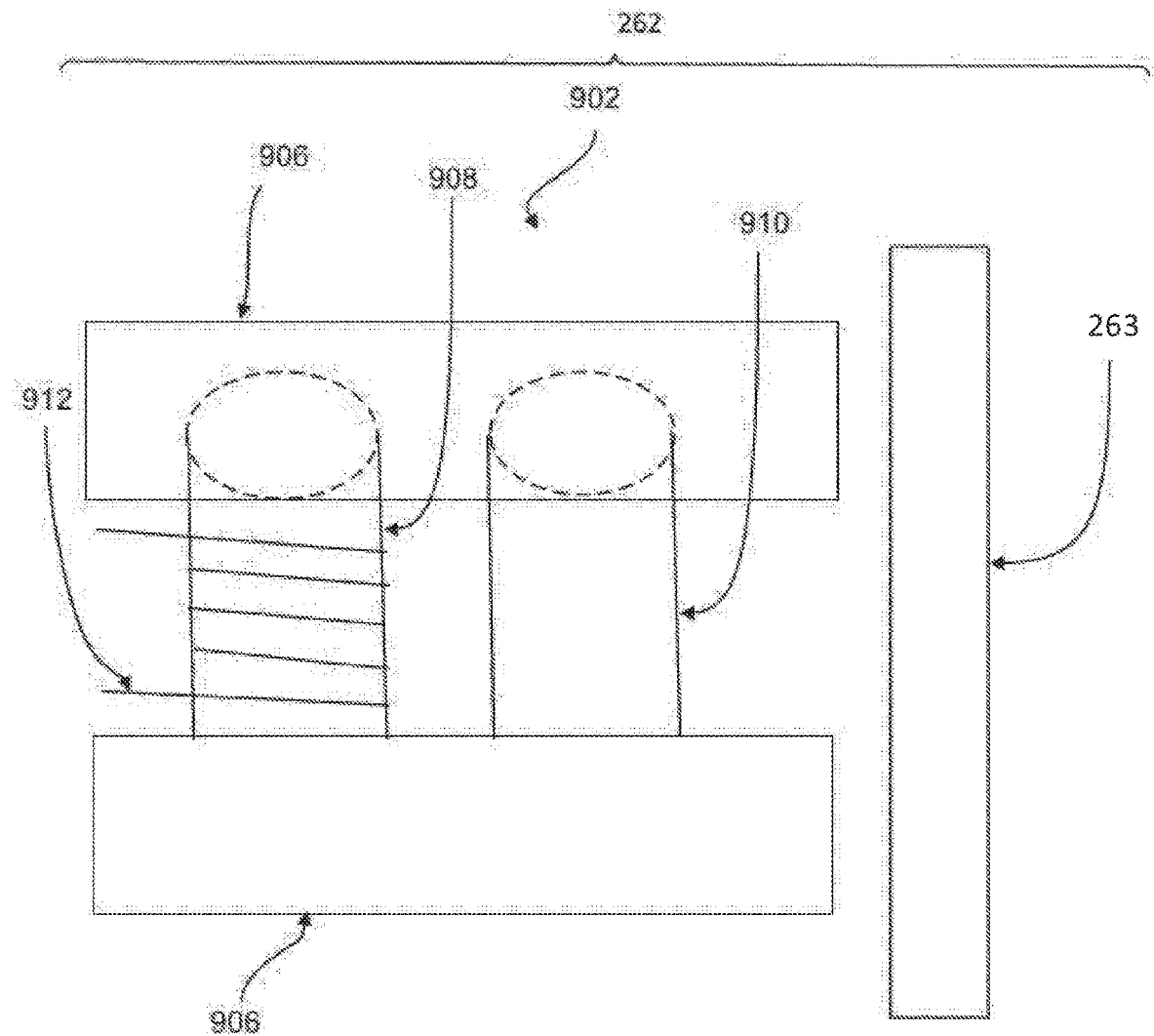
Figure 9E:
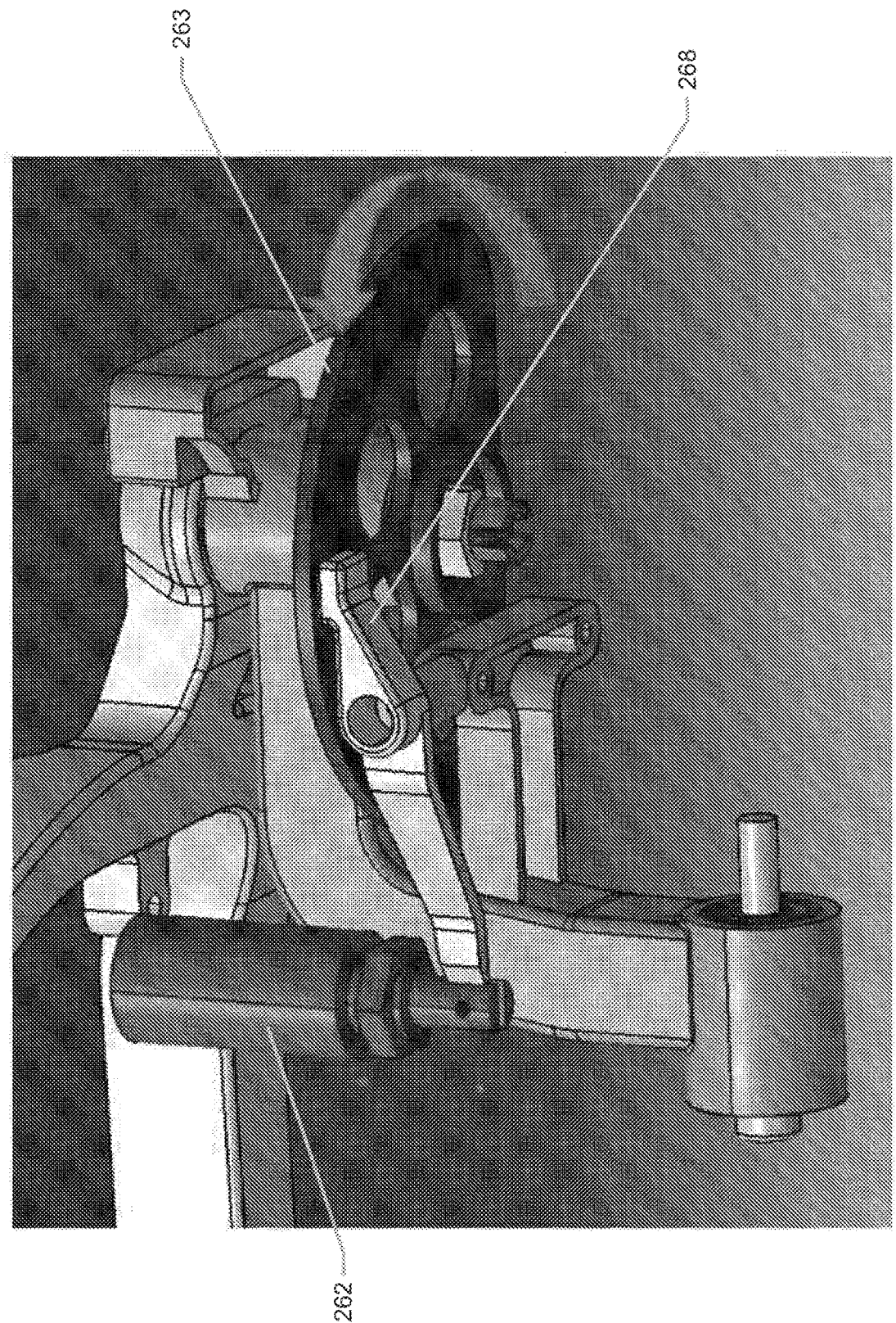
Figure 9F:
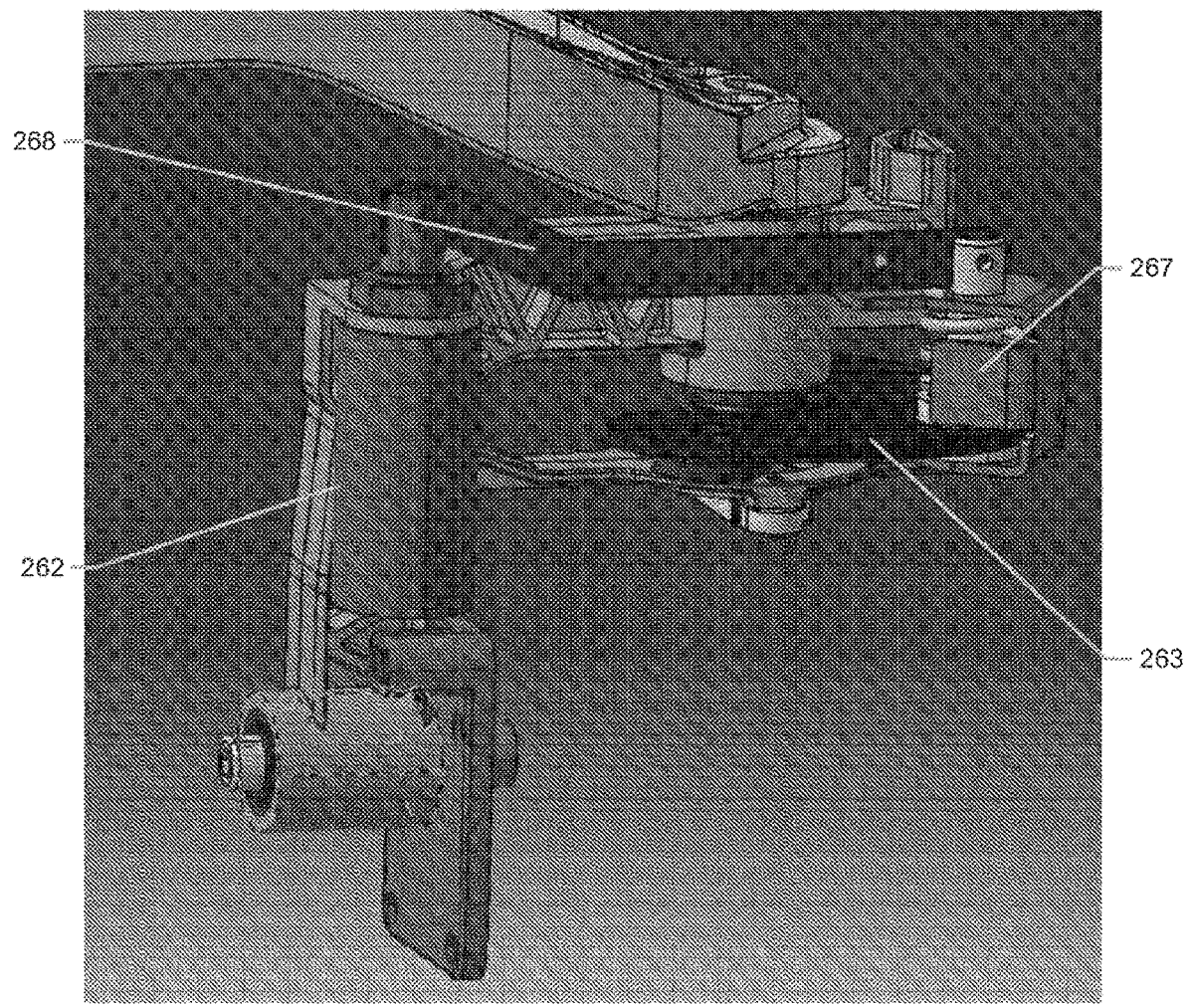
Figure 9G:
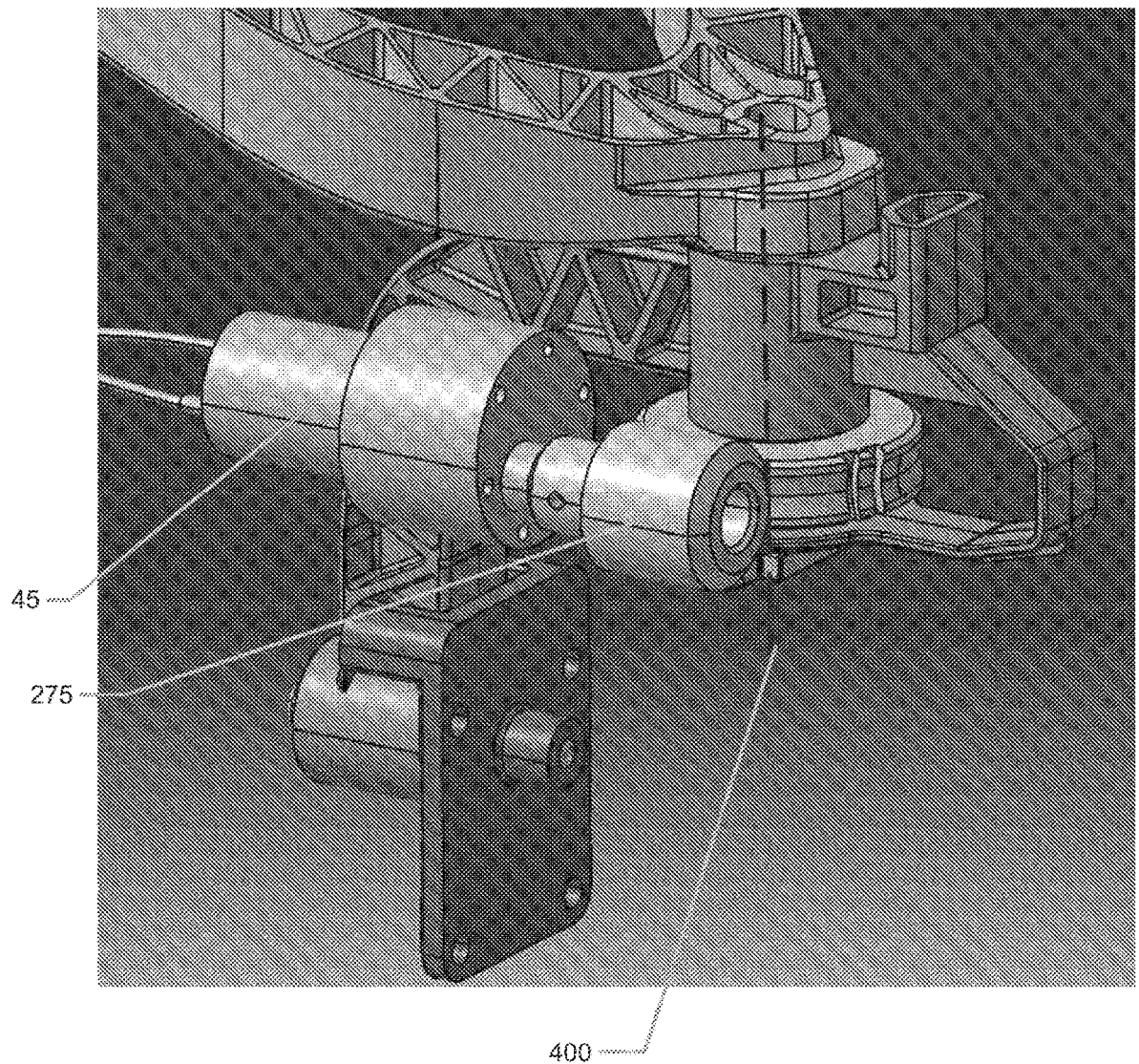
Figure 10A:
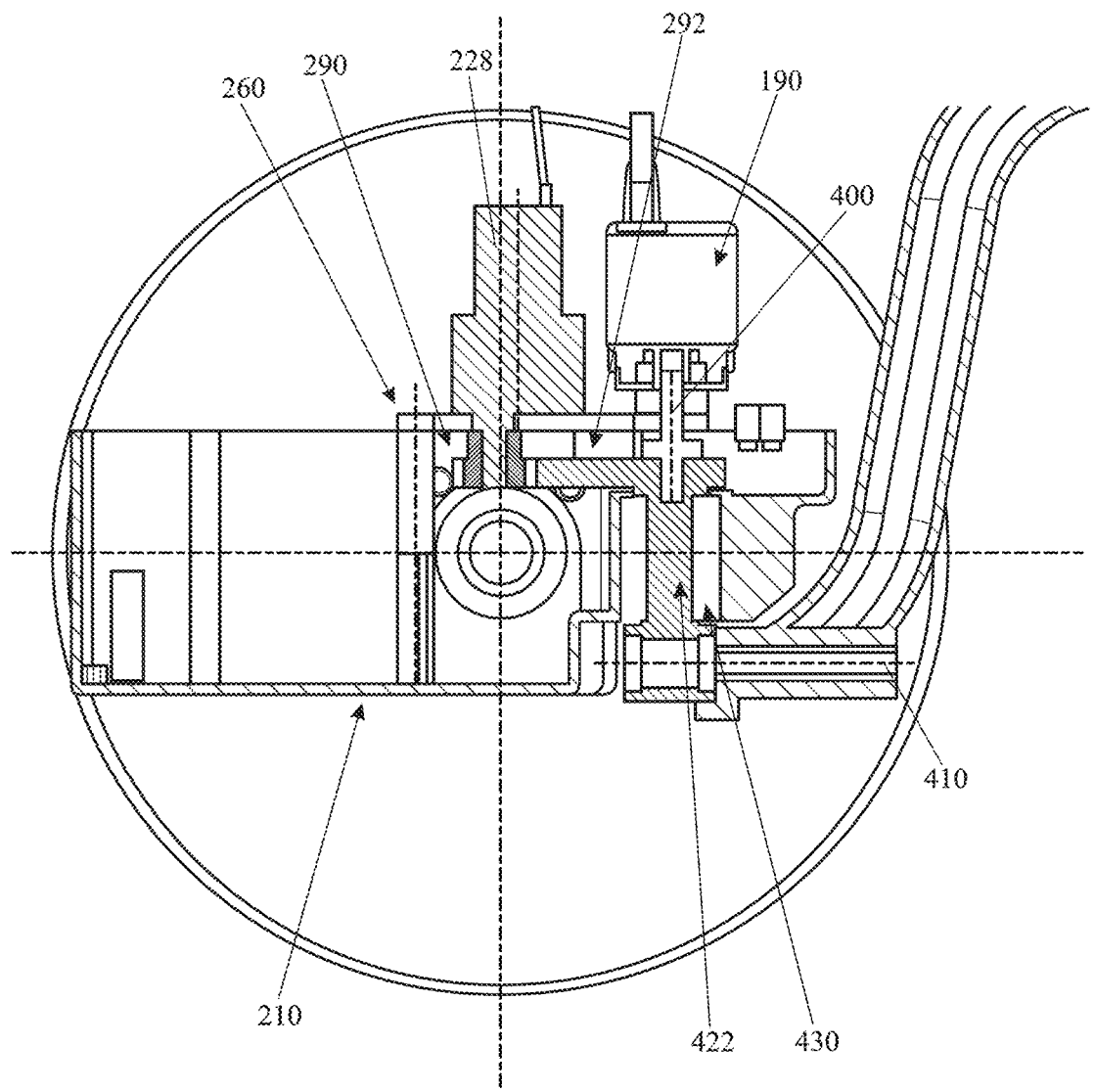
Figure 10B:
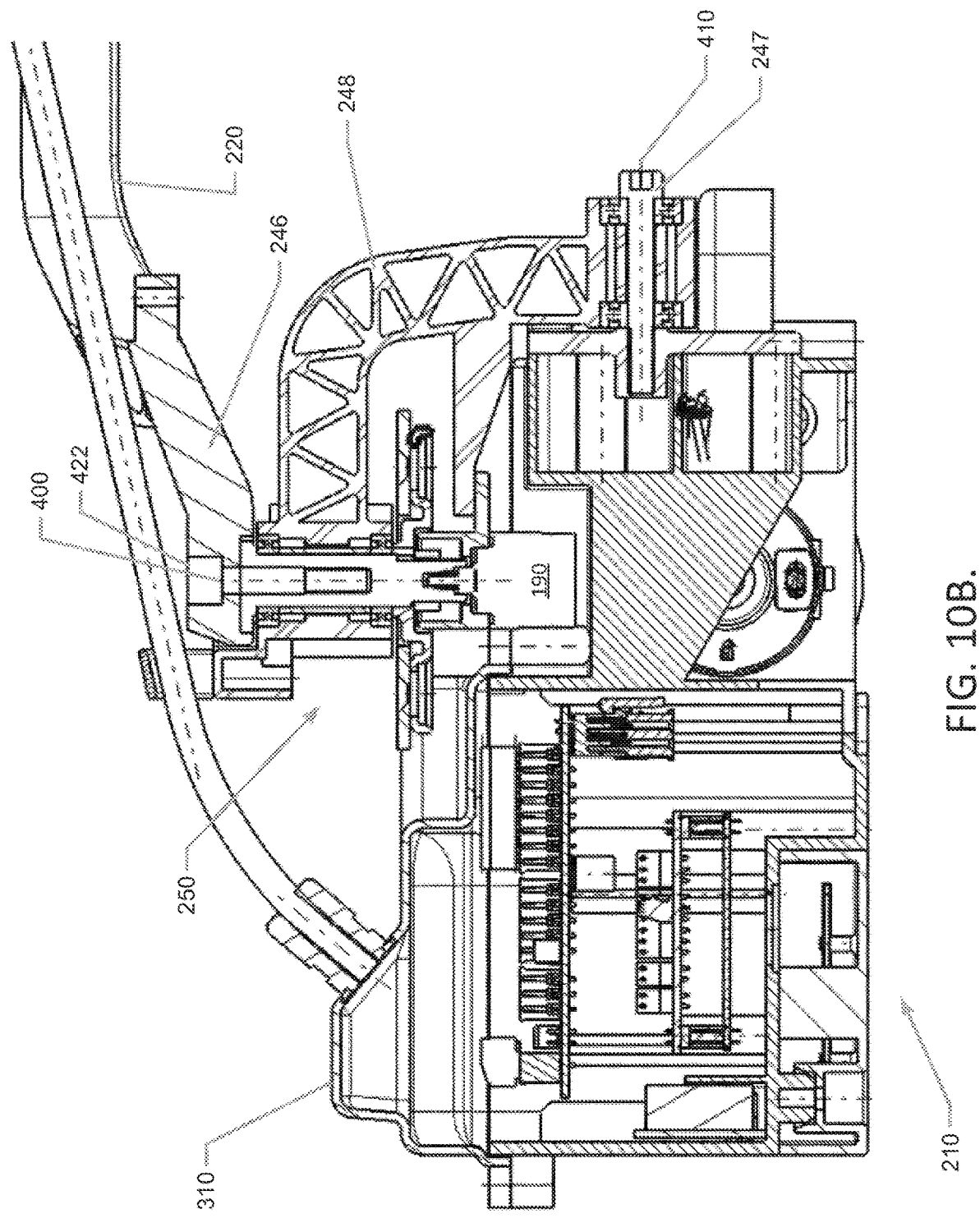
Figure 11A:
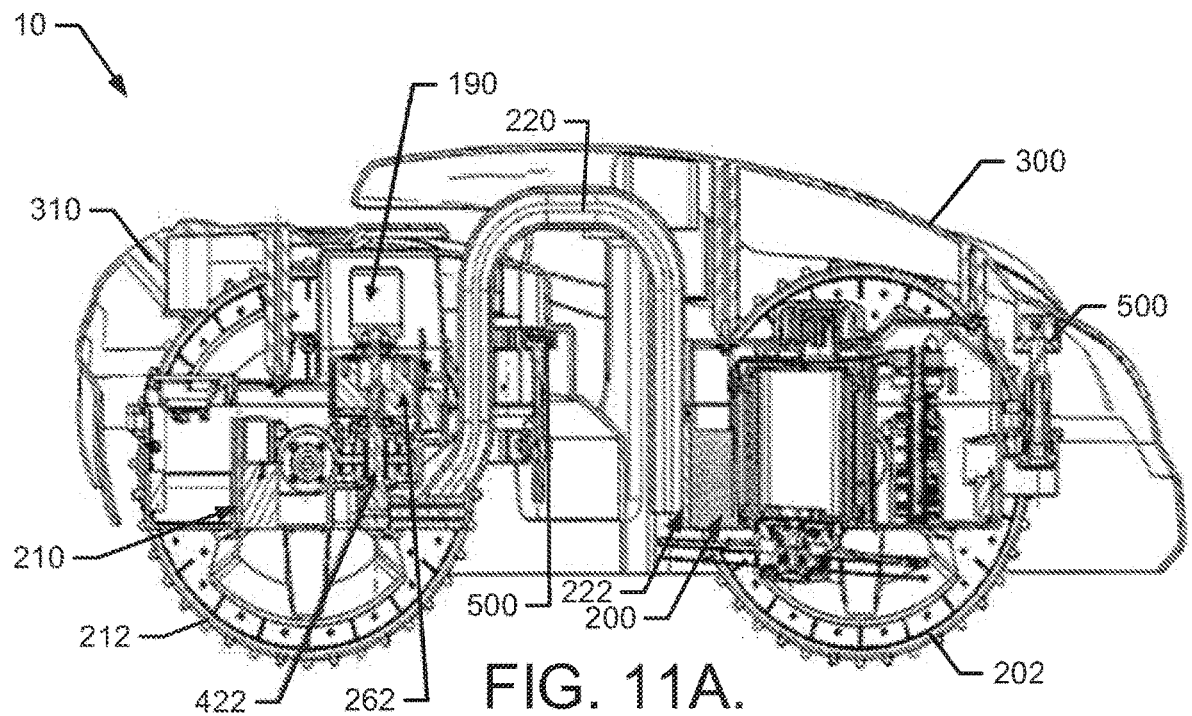
Figure 11B:
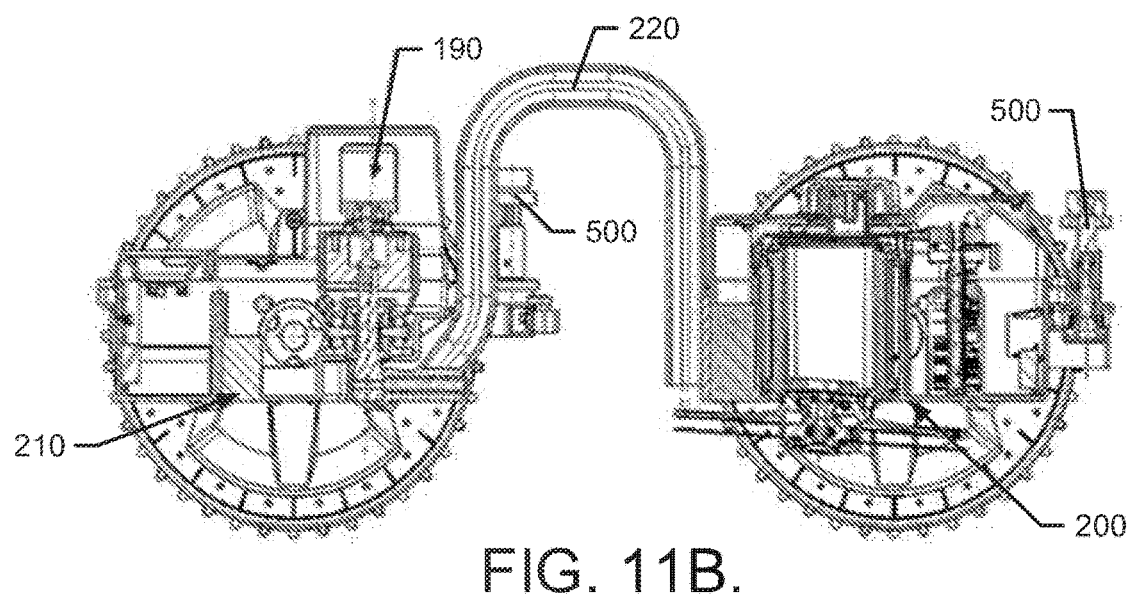
Figure 12:
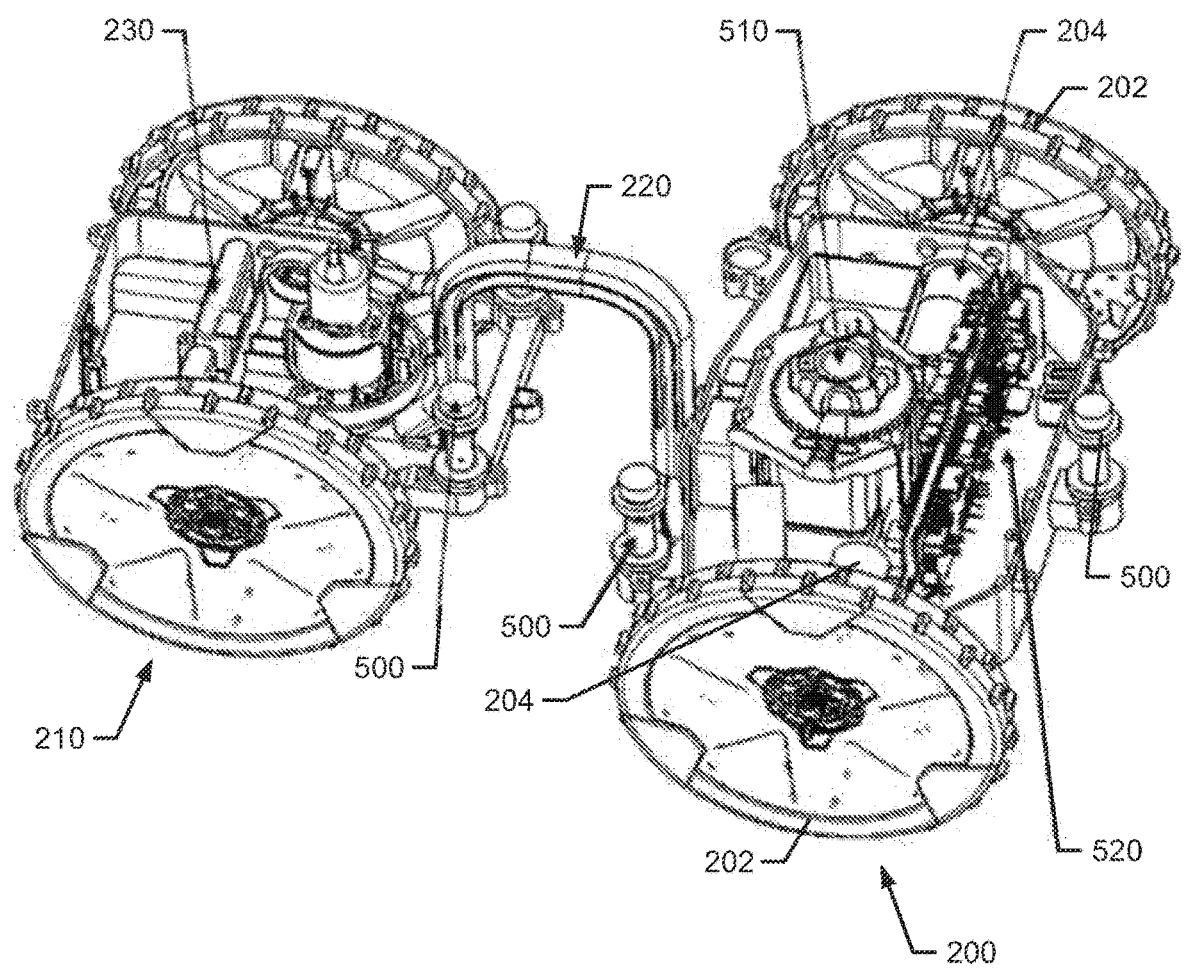
Figure 13:
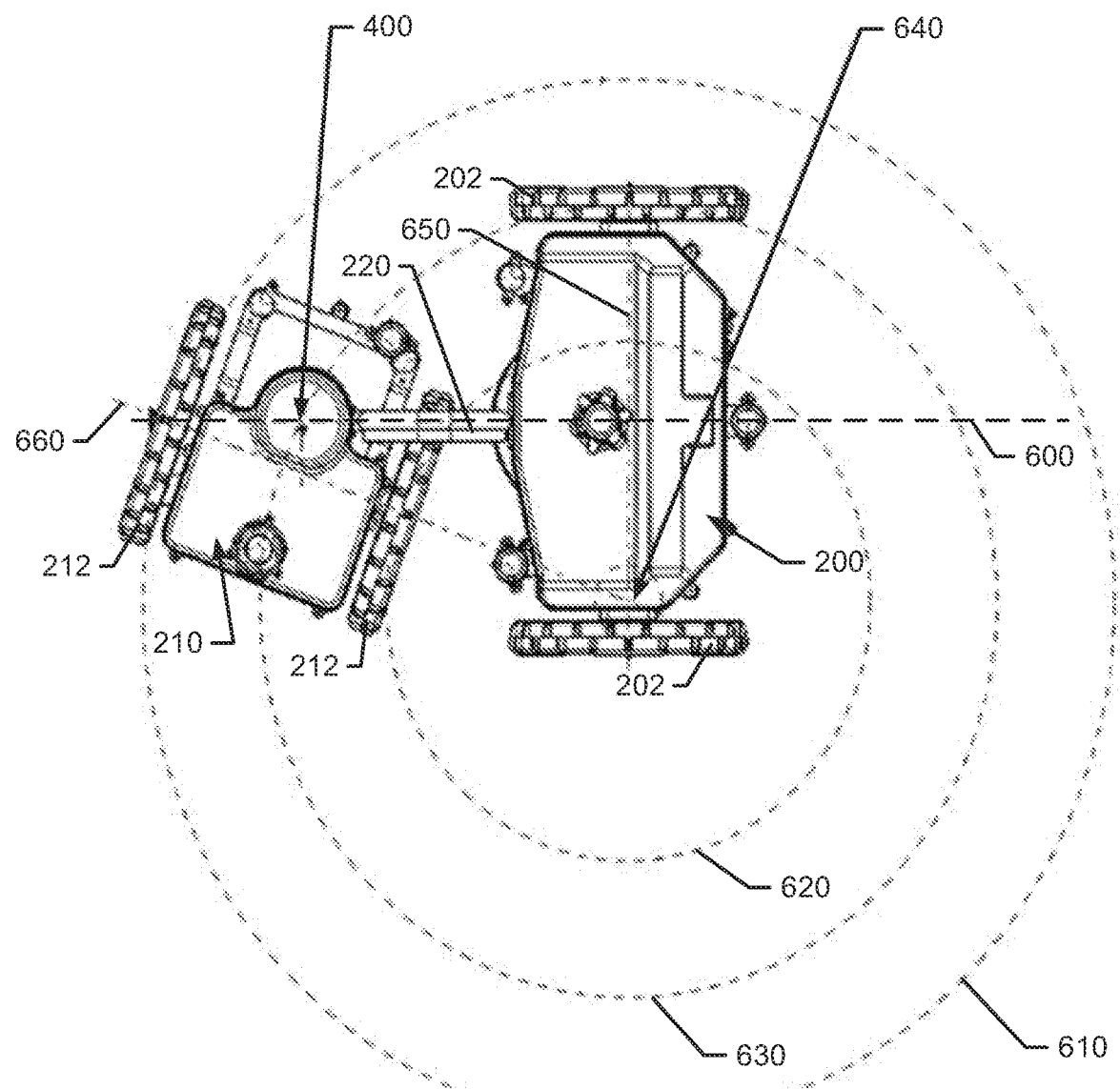
Figure 14:
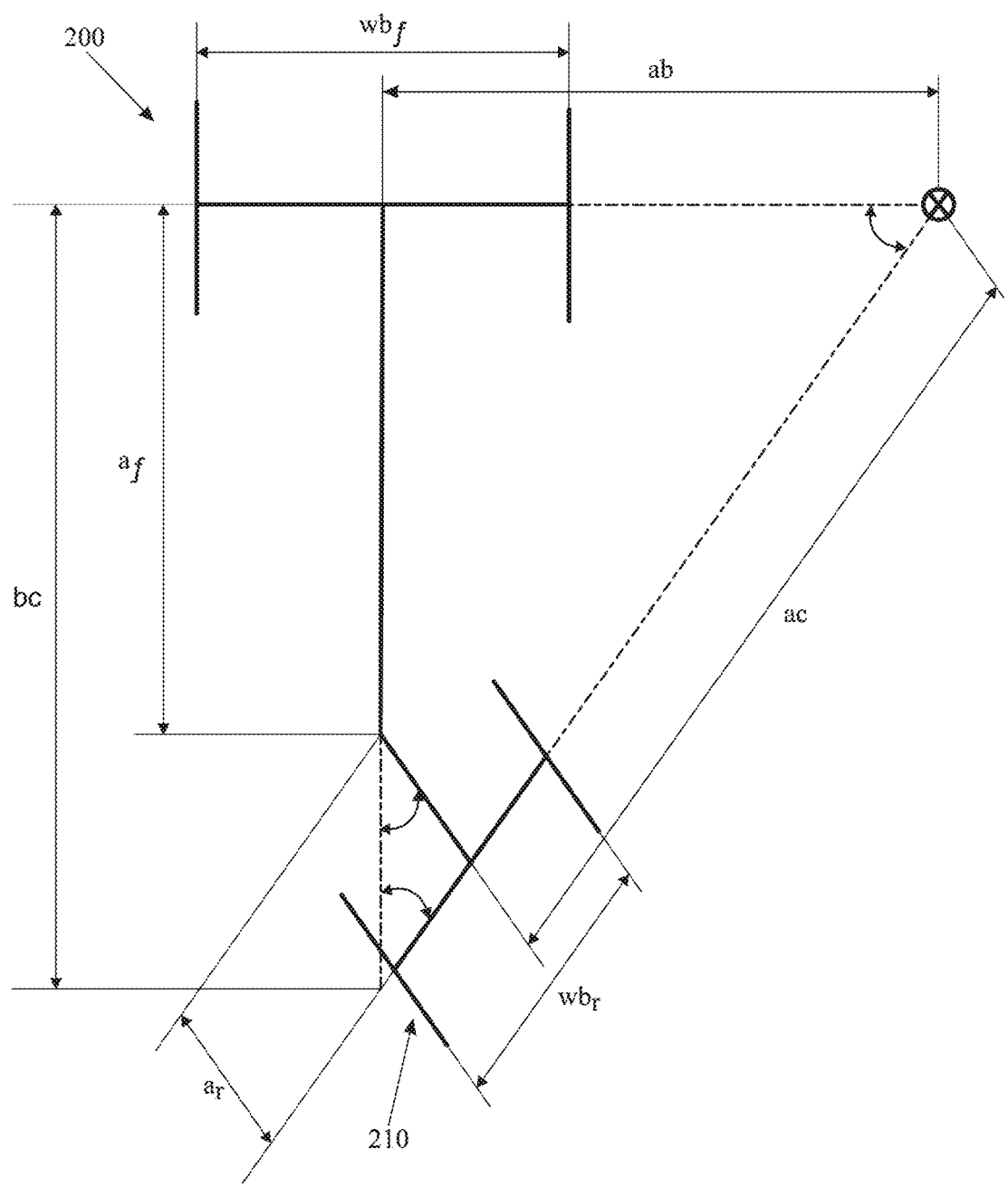
Figure 15:
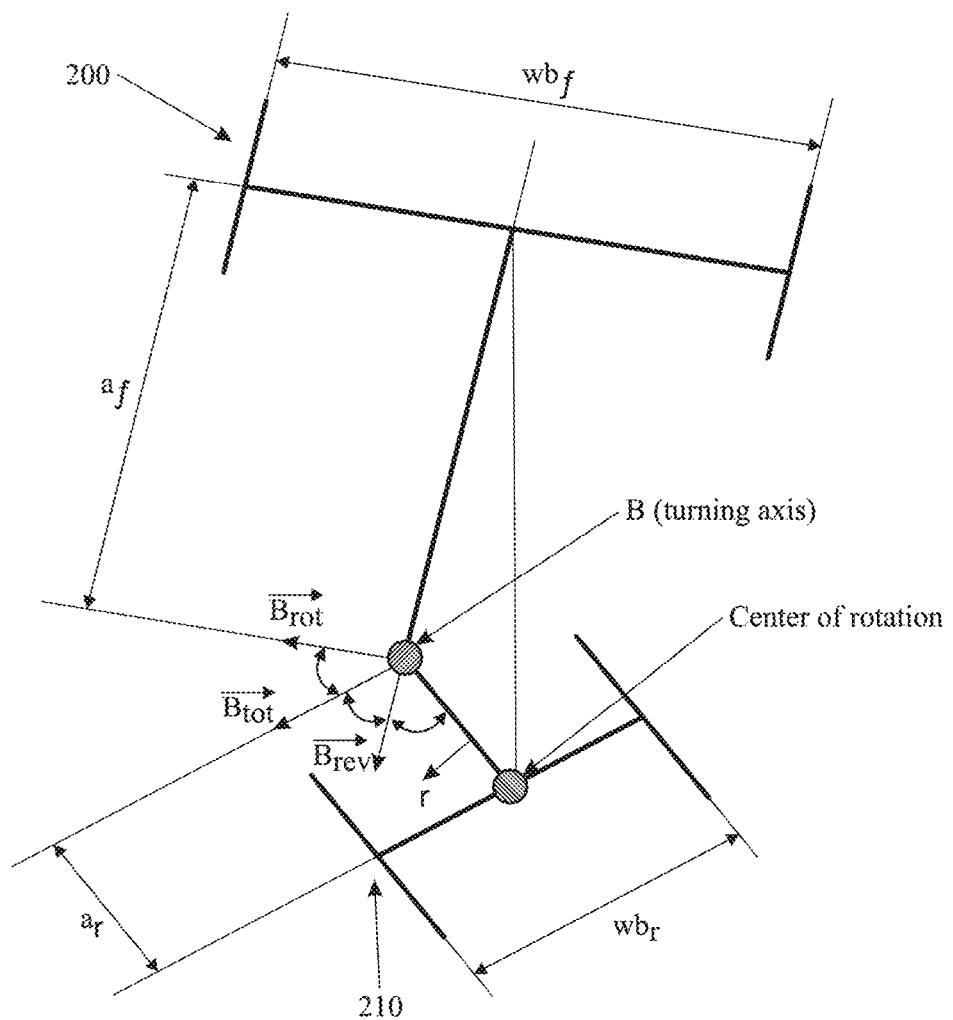
Figure 16A:
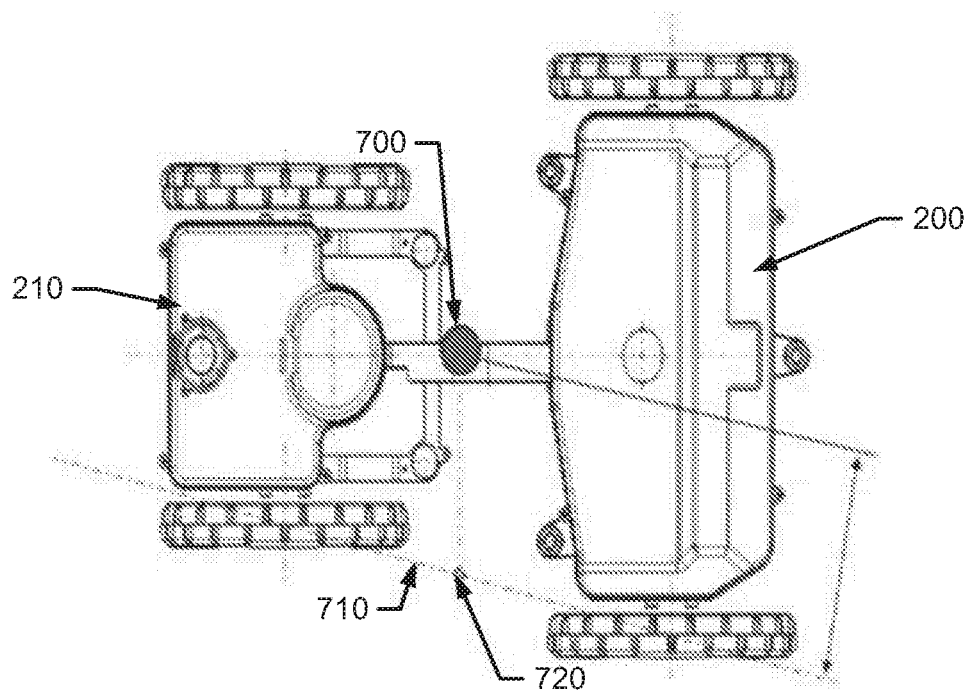
Figure 16B:
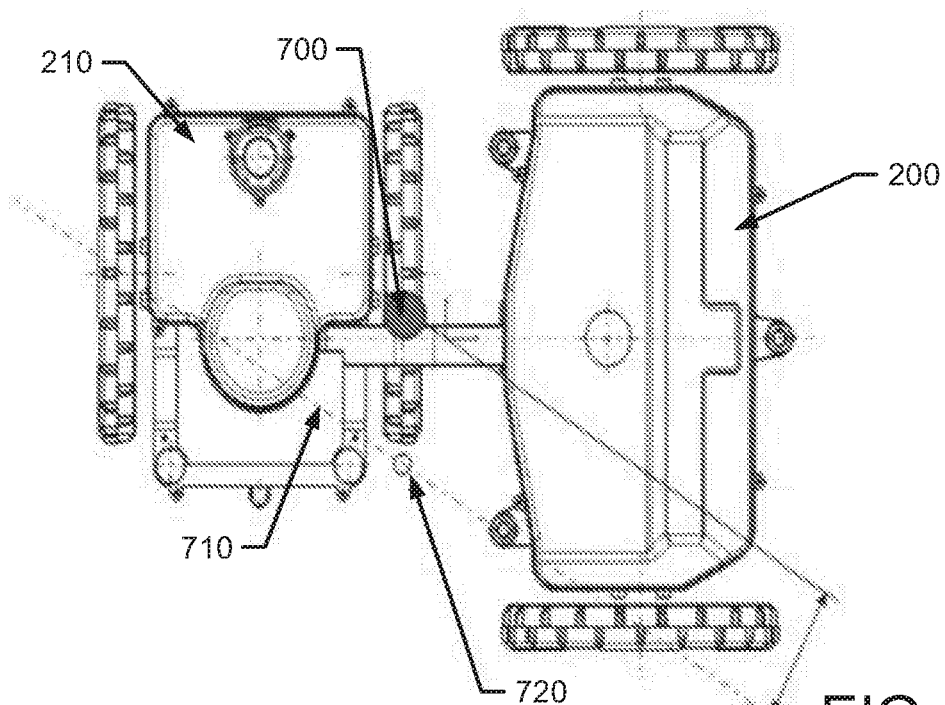
Figure 17A:
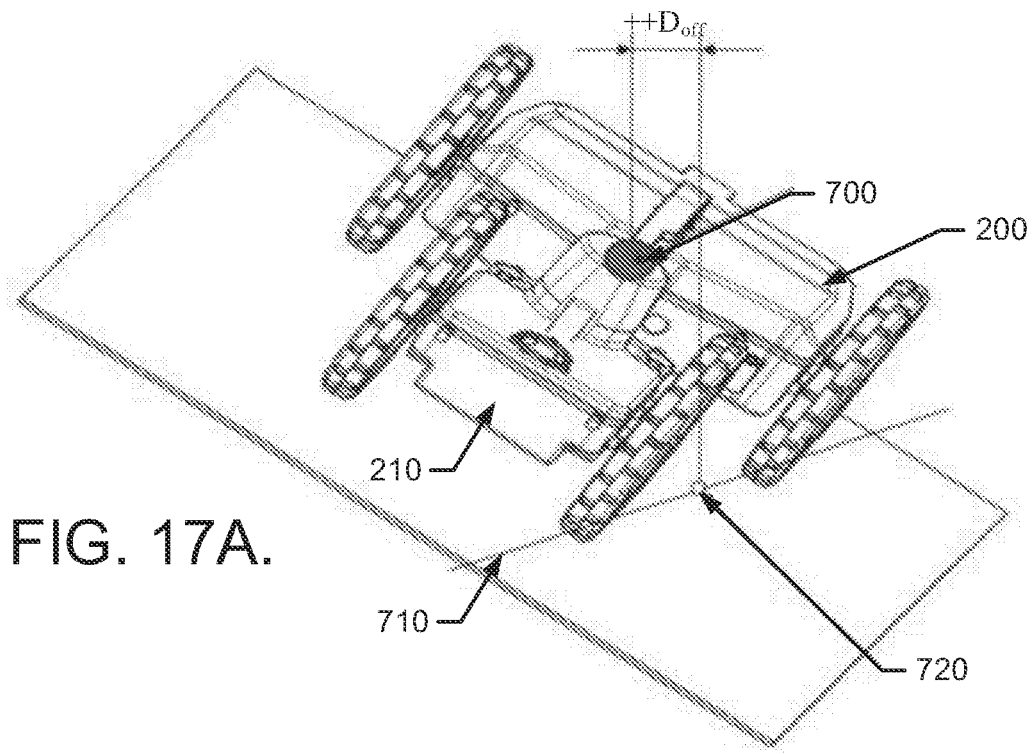
Figure 17B:
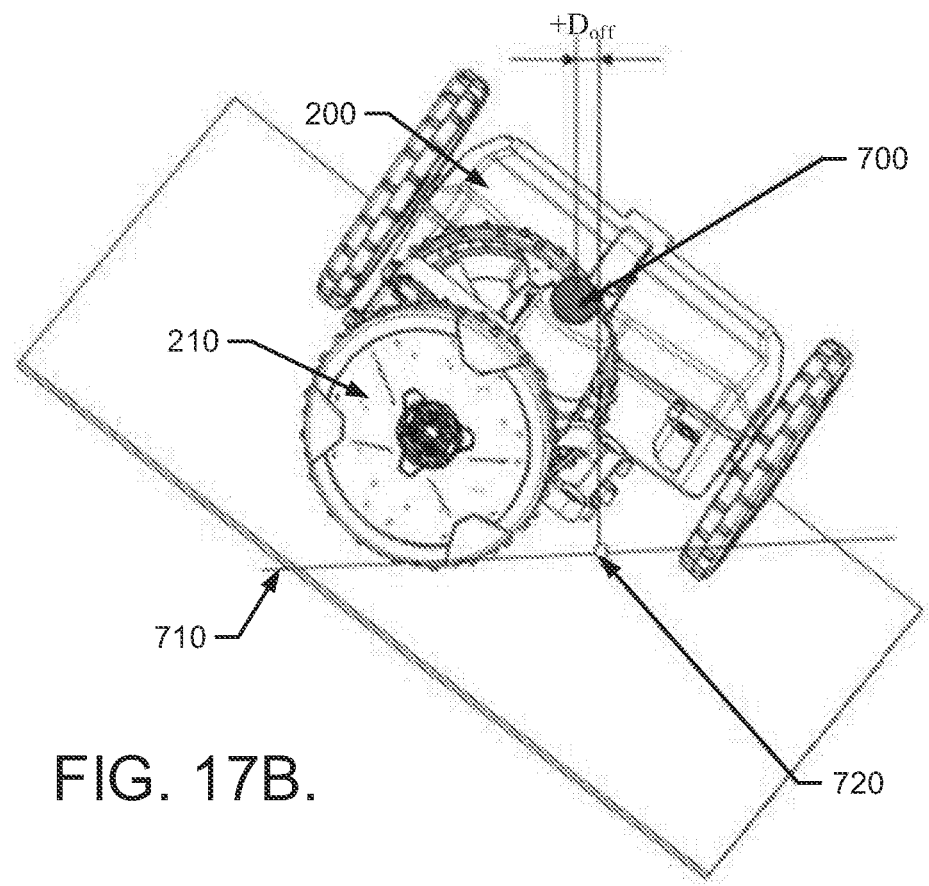
Figure 18A:
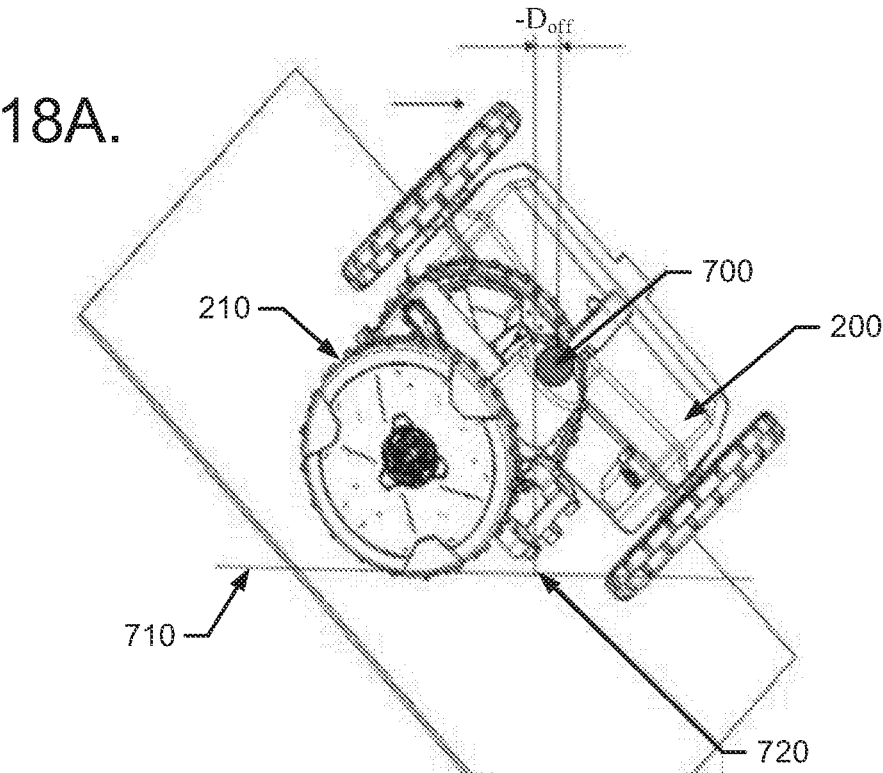
Figure 18B:
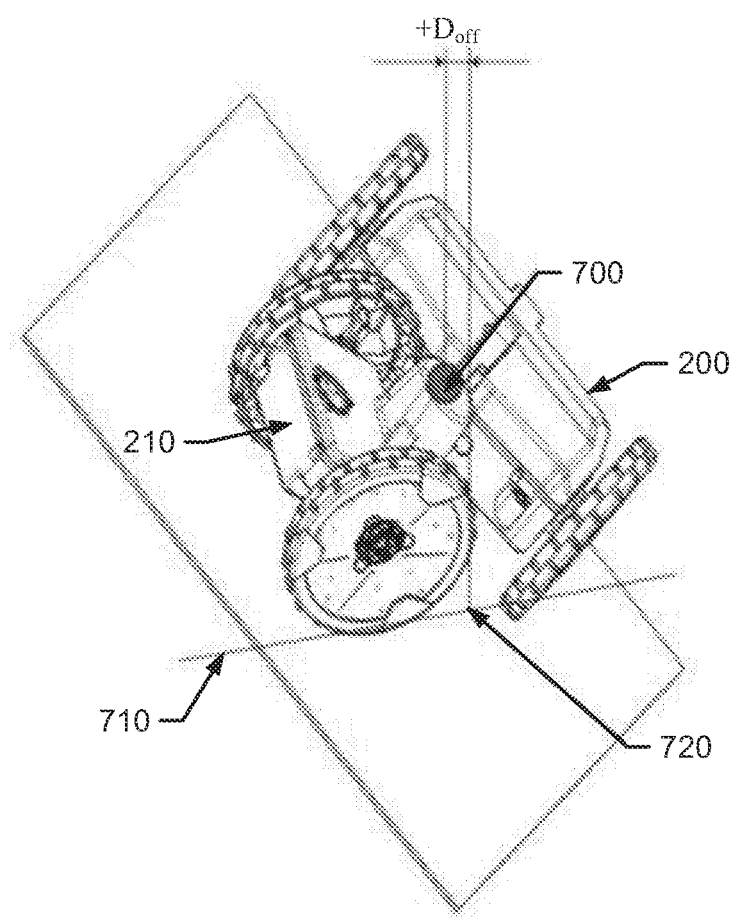
Figure 19:
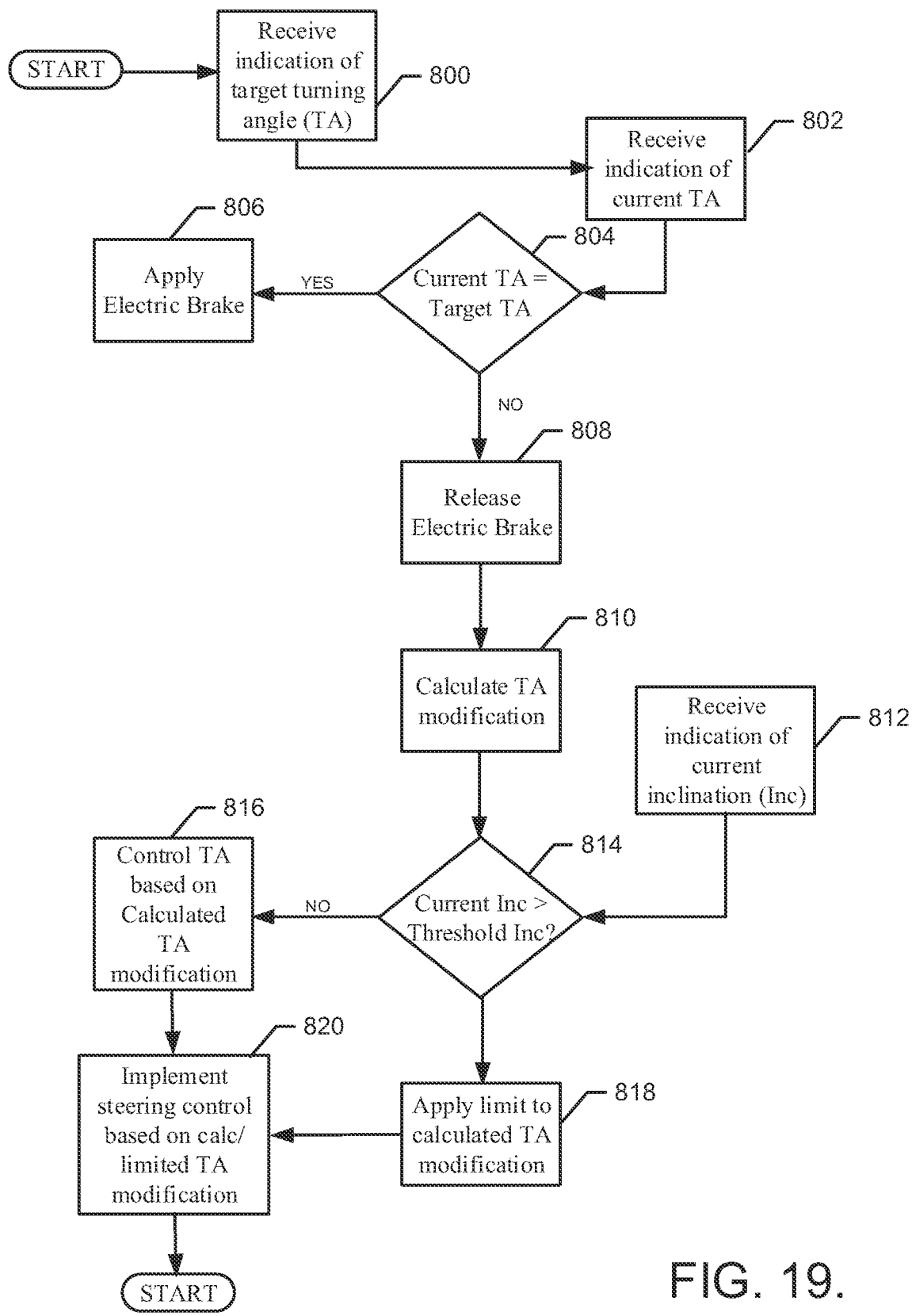
Figure 20:
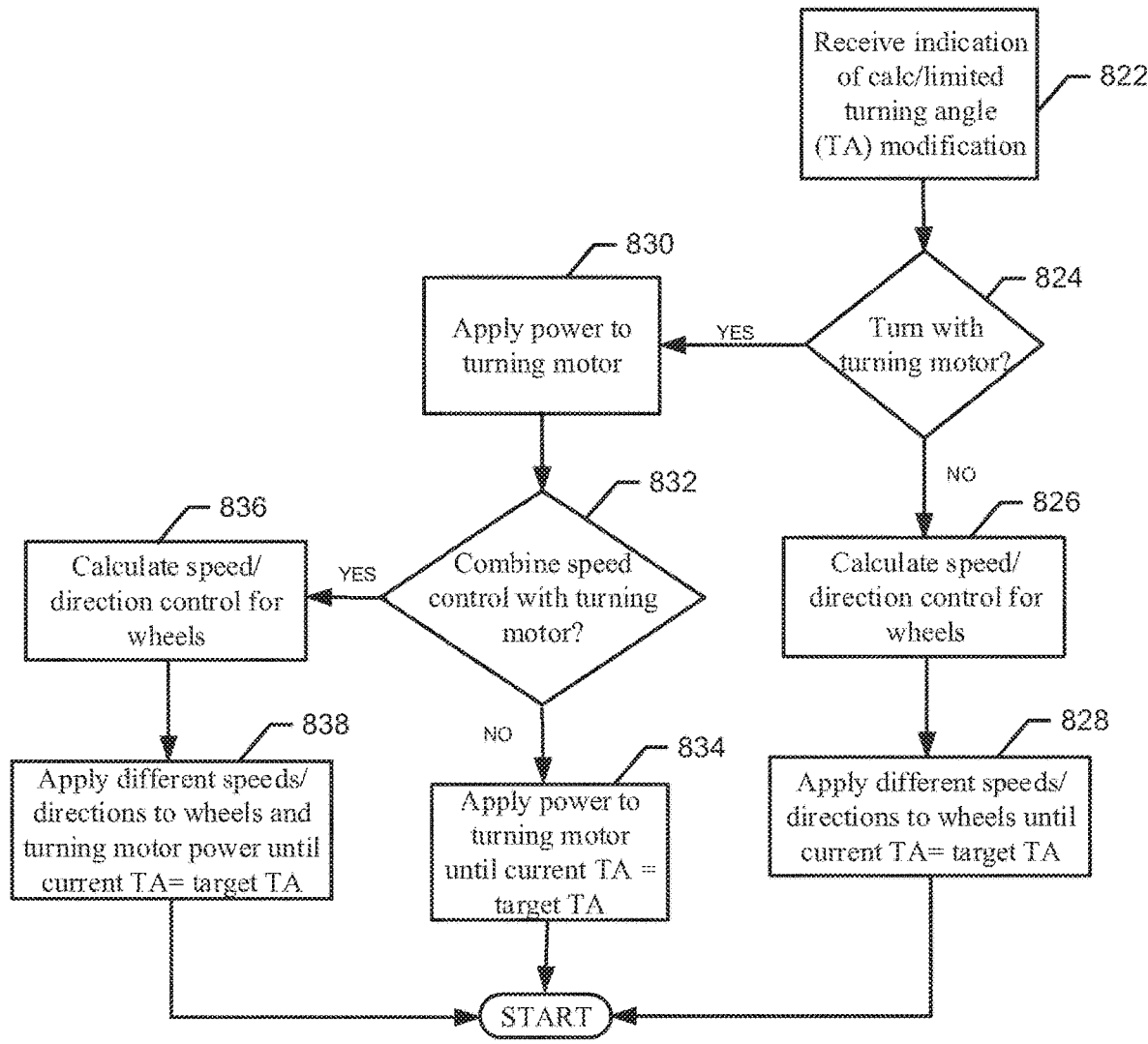

FIG. 8, which includes FIGS. 8A and 8B, shows examples of how pivoting about the pivot axis allows a common axis of a first wheel assembly and a common axis of a second wheel assembly to be in different planes in accordance with an example embodiment;

FIG. 9A illustrates a cross section view of the turn assembly to facilitate a description of how the rotation about the turning axis and pivot axis may be accomplished in accordance with one example embodiment;

FIG. 9B illustrates a perspective view of a turn assembly in accordance with an example embodiment;

FIG. 9C illustrates a perspective view of an electric brake in accordance with an example embodiment;

FIG. 9D illustrates a diagram of an electric brake in accordance with an example embodiment;

FIG. 9E illustrates an example electric brake according to an example embodiment;

FIG. 9F illustrates an example electric brake according to an example embodiment;

FIG. 9G illustrates an example turning motor gear drive according to an example embodiment;

FIGS. 10A and 10B illustrate cross section views of a portion of the second chassis platform of example embodiments, to illustrate how a turning motor may be implemented according to an example embodiment;

FIG. 11, which includes FIGS. 11A and 11B, shows a cross sectional view of the robotic mower to illustrate some components of an example embodiment;

FIG. 12 illustrates a perspective view of the robotic mower with cover portions of the chassis platforms further removed to illustrate some components of an example embodiment;

FIG. 13 illustrates a top view of the robotic mower executing a turn in accordance with an example embodiment;

FIG. 14 illustrates a conceptual representation of the robotic mower to show various geometric values that are used in calculations for use in conducting turning operations in accordance with an example embodiment;

FIG. 15 illustrates a conceptual representation of the robotic mower to show various geometric values that are used in calculations for use in conducting turning operations in accordance with an alternate example embodiment;

FIG. 16, which includes FIGS. 16A and 16B, illustrates a relationship between a center of gravity of the robotic mower and a contact line passing through a point at which each of the lower wheels contacts the ground in accordance with an example embodiment;

FIG. 17, which includes FIGS. 17A and 17B, illustrates a front perspective view of the same situations in FIGS. 16A and 16B respectively, on a given slope in accordance with an example embodiment;

FIG. 18, which includes FIGS. 18A and 18B, illustrates a front perspective view of the robotic mower on a larger slope than that shown in FIG. 17, and having wheels turned 90 degrees in FIG. 18A and only 45 degrees in FIG. 18B in accordance with an alternate example embodiment;

FIG. 19 illustrates a block diagram of a method for controlling steering for a robotic vehicle in accordance with an example embodiment; and FIG. 20 illustrates a block diagram of a method for enabling control of the turning angle of the robotic mower according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Robotic vehicles, such as robotic mowers, are generally expected to run autonomously over a defined area and perform a function (e.g., mowing). In the simplest of environments, where the area is relatively small and flat, with a somewhat regular shape, the robotic vehicle may be able to traverse the area with ease. However, when designing and building robotic vehicles, such vehicles must be designed for the worst case scenario and not the simplest in order to ensure that the final product can be successful in the marketplace. Thus, maneuverability in all sorts of environments (e.g., hilly terrain, narrow paths, complex shaped areas, etc.) can be an important feature of such devices.

One aspect of maneuverability that can be helpful for robotic vehicles configured to operate in challenging environments is the ability to make small radius turns. Providing a robotic vehicle that can turn at or near a turning angle of about 90 degrees can be a significant advantage. However, whether turning on slopes or sharply, it may be possible to tear up grass or even tip the robotic vehicle over in some situations. Thus, simply providing a robotic vehicle with sharp turning capabilities is not necessarily the end of the issue. A robotic vehicle with sharp turning capabilities should be controlled in a manner that intelligently employs its capabilities to avoid damaging grass and/or the vehicle itself.

In some instances, such as steep slopes or uneven surfaces the rear chassis and wheels may be unstable, e.g. self steer, if a free bearing in employed. A brake may be used when mower is driving straight forward or backward, or when the mower is executing a turn. In some examples an electromagnetic brake, such as an electropermanent magnet, may be used. The electric brake may be released when the mower is changing the turn angle and applied when the turn angle, including straight, is achieved, limiting or preventing unintentional turning of the mower during operation.

Example embodiments are therefore described herein to provide various structural and control-related design features that can be employed to improve the capabilities of robotic vehicles (e.g., robotic mowers, mobile sensing devices, watering devices and/or the like) to be expanded and employed in an intelligent manner. Other structures may also be provided and other functions may also be performed as described in greater detail below.

Figure 1:
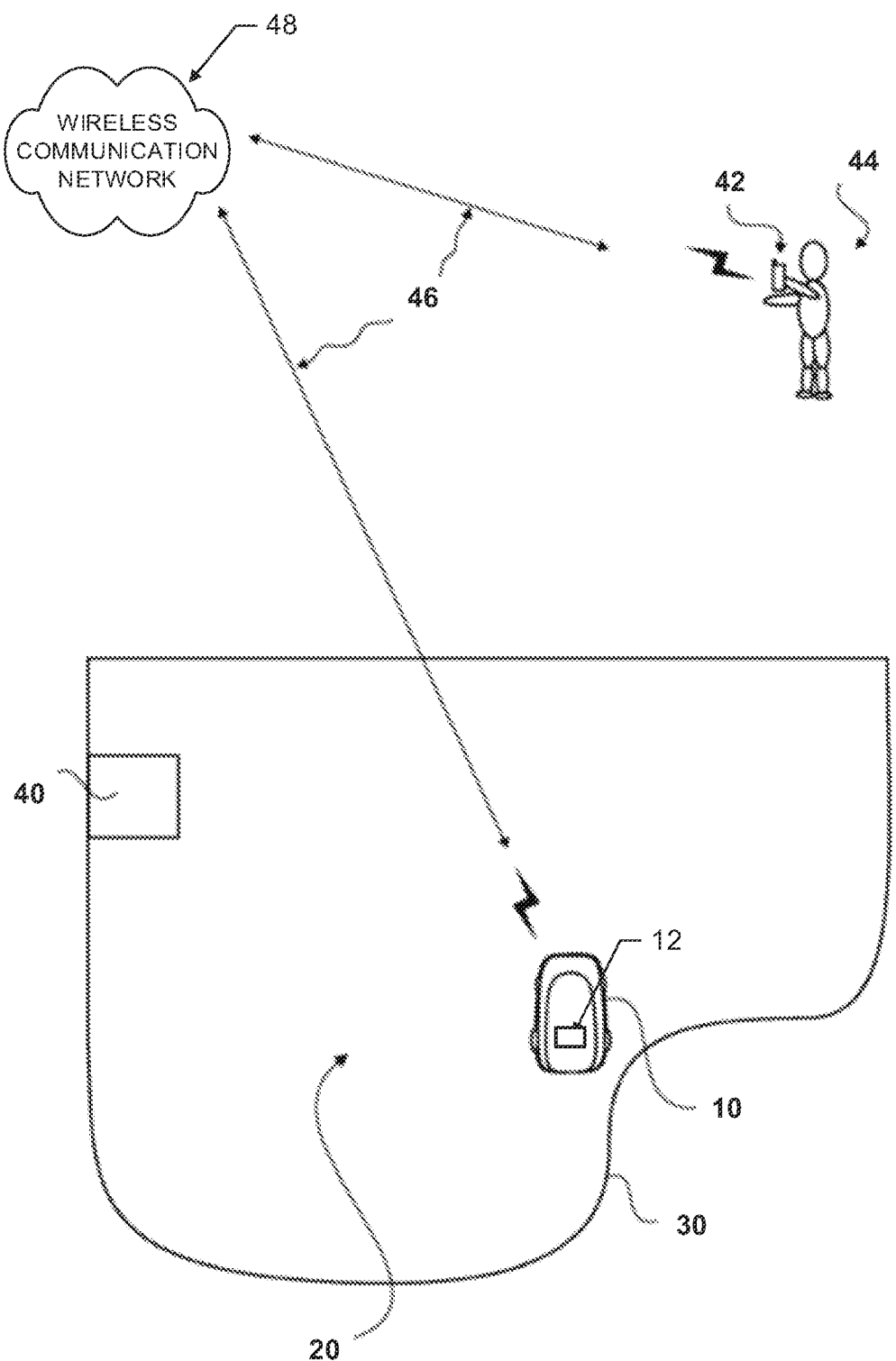
FIG. 1 illustrates an example operating environment for a robotic mower that may employ an example embodiment.

FIG. 1 illustrates an example operating environment for a robotic mower 10 that may be employed in connection with an example embodiment. However, it should be appreciated that example embodiments may be employed on numerous other robotic vehicles, so the robotic mower 10 should be recognized as merely one example of such a vehicle. The robotic mower 10 may operate to cut grass on a parcel 20 (i.e., a land lot or garden), the boundary 30 of which may be defined using one or more physical boundaries (e.g., a fence, wall, curb and/or the like), a boundary wire, programmed location based boundaries or combinations thereof. When the boundary 30 is a boundary wire, the boundary wire may emit electrical signals that are detectable by the robotic mower 10 to inform the robotic mower 10 when the boundary 30 of the parcel 20 has been reached.

The robotic mower 10 may be controlled, at least in part, via control circuitry 12 located onboard. The control circuitry 12 may include, among other things, a positioning module and a sensor module, which will be described in greater detail below. Accordingly, the robotic mower 10 may utilize the control circuitry 12 to define a path for coverage of the parcel 20 in terms of performing a task over specified portions or the entire parcel 20. In this regard, the positioning module may be used to guide the robotic mower 10 over the parcel 20 and to ensure that full coverage (of at least predetermined portions of the parcel 20) is obtained, while the sensor module may detect objects and/or gather data regarding the surroundings of the robotic mower 10 while the parcel 20 is traversed.

If a sensor module is employed, the sensor module may include a sensors related to positional determination (e.g., a boundary wired detector, a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors may be used, at least in part, for determining the location of the robotic mower 10 relative to boundaries or other points of interest (e.g., a starting point or other key features) of the parcel 20, or determining a position history or track of the robotic mower 10 over time. The sensors may also detect collision, tipping over, or various fault conditions. In some cases, the sensors may also or alternatively collect data regarding various measurable parameters (e.g., moisture, temperature, soil conditions, etc.) associated with particular locations on the parcel 20. Further, in some cases, the sensors may be used to detect slope and/or traction impacting conditions along with the amount of or angle of turn being attempted by the robotic vehicle. As will be discussed below, the robotic mower 10 may be configured to control the turn angle based on various factors to optimize turning capabilities while minimizing any risks associated with engaging in large angle turns in certain conditions or circumstances.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system and a blade control system of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry 12 in a manner that enables the robotic mower 10 to systematically traverse the parcel while operating a cutting blade to cut the grass on the parcel 20. In cases where the robotic vehicle is not a mower, the control circuitry 12 may be configured to control another functional or working assembly that may replace the blade control system.

In some embodiments, the control circuitry 12 and/or a communication node at the charge station 40 may be configured to communicate wirelessly with an electronic device 42 (e.g., a personal computer, a cloud based computer, server, mobile telephone, PDA, tablet, smart phone, and/or the like) of a remote operator 44 (or user) via wireless links 46 associated with a wireless communication network 48. The wireless communication network 48 may provide operable coupling between the remote operator 44 and the robotic mower 10 via the electronic device 42, which may act as a remote control device for the robotic mower 10 or may receive data indicative or related to the operation of the robotic mower 10. However, it should be appreciated that the wireless communication network 48 may include additional or internal components that facilitate the communication links and protocols employed. Thus, some portions of the wireless communication network 48 may employ additional components and connections that may be wired and/or wireless. For example, the charge station 40 may have a wired connection to a computer or server that is connected to the wireless communication network 48, which may then wirelessly connect to the electronic device 42. As another example, the robotic mower 10 may wirelessly connect to the wireless communication network 48 (directly or indirectly) and a wired connection may be established between one or more servers of the wireless communication network 48 and a PC of the remote operator 44. In some embodiments, the wireless communication network 48 may be a data network, such as a local area network (LAN), a metropolitan area network (MAN), a wide area network (WAN) (e.g., the Internet), and/or the like, which may couple the robotic mower 10 to devices such as processing elements (e.g., personal computers, server computers or the like) or databases. Accordingly, communication between the wireless communication network 48 and the devices or databases (e.g., servers, electronic device 42, control circuitry 12) may be accomplished by either wireline or wireless communication mechanisms and corresponding protocols.

Figure 2:
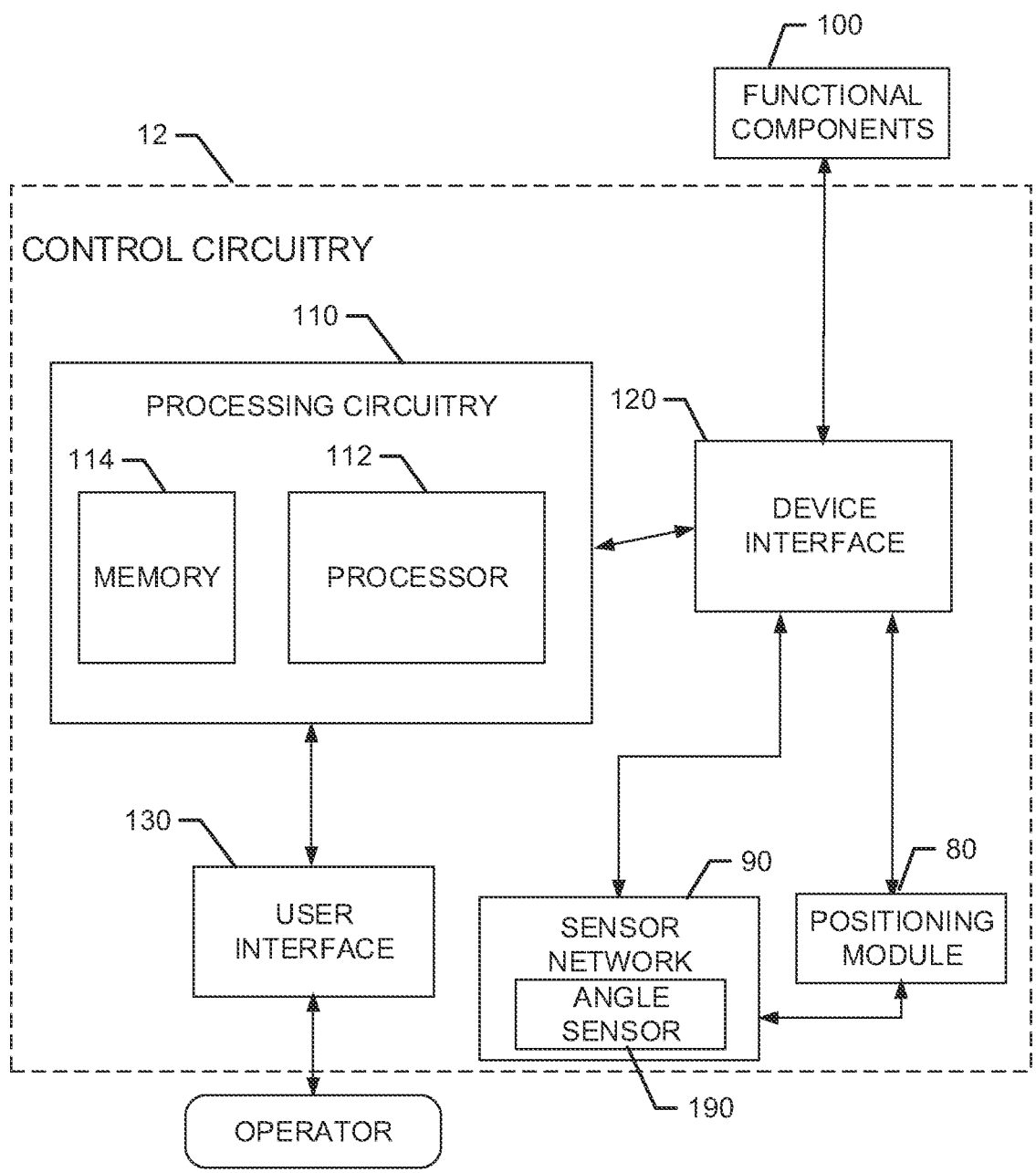
FIG. 2 illustrates a block diagram of various components of processing circuitry of the robotic mower to illustrate some of the components that enable the functional performance of the robotic mower and to facilitate description of an example embodiment.

FIG. 2 illustrates a block diagram of various components of the control circuitry 12 to illustrate some of the components that enable or enhance the functional performance of the robotic mower 10 and to facilitate description of an example embodiment. In some example embodiments, the control circuitry 12 may include or otherwise be in communication with a positioning module 80 and/or a sensor network 90 disposed at the robotic mower 10. As such, for example, the functions attributable to the positioning module 80 and/or the sensor network 90 may be carried out by, under the control of, or in cooperation with the control circuitry 12 in some cases.

The control circuitry 12 may include processing circuitry 110 that may be configured to perform data processing or control function execution and/or other processing and management services according to an example embodiment of the present invention. In some embodiments, the processing circuitry 110 may be embodied as a chip or chip set. In other words, the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software or a combination of hardware and software) to perform operations described herein. However, in some embodiments, the processing circuitry 110 may be embodied as a portion of an on-board computer. In some embodiments, the processing circuitry 110 may communicate with electronic components and/or sensors of the robotic mower 10 via a single data bus. As such, the data bus may connect to a plurality or all of the switching components, sensory components and/or other electrically controlled components of the robotic mower 10.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the positioning module 80, the sensor network 90, and/or other functional components 100 of or associated with the robotic mower 10. As such, in some embodiments, the processor 112 (or the processing circuitry 110) may be said to cause each of the operations described in connection with the positioning module 80, the sensor network 90, and/or other functional components 100 by directing the positioning module 80, the sensor network 90, and/or other functional components 100, respectively, to undertake the corresponding functionalities responsive to execution of instructions or algorithms configuring the processor 112 (or processing circuitry 110) accordingly. These instructions or algorithms may configure the processing circuitry 110, and thereby also the robotic mower 10, into a tool for performing corresponding functions in the physical world in accordance with the instructions provided.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the positioning module 80, the sensor network 90, and/or other functional components 100 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative, the memory 114 may include one or more databases that may store a variety of data sets responsive to input from various sensors or components of the robotic mower 10. Among the contents of the memory 114, applications may be stored for execution by the processor 112 in order to carry out the functionality associated with each respective application.

The user interface 130 (if implemented) may be in communication with the processing circuitry 110 to receive an indication of a user input at the user interface 130 and/or to provide an audible, visual, mechanical or other output to the user. As such, the user interface 130 may include, for example, a display, one or more buttons or keys (e.g., function buttons), and/or other input/output mechanisms (e.g., microphone, speakers, cursor, joystick, lights and/or the like).

The device interface 120 may include one or more interface mechanisms for enabling communication with other devices either locally or remotely. In some cases, the device interface 120 may be any means such as a device or circuitry embodied in either hardware, or a combination of hardware and software that is configured to receive and/or transmit data from/to sensors or other components in communication with the processing circuitry 110. In some example embodiments, the device interface 120 may provide interfaces for communication of data from the control circuitry 12, the positioning module 80, the sensor network 90, and/or other functional components 100 via wired or wireless communication interfaces in a real-time manner, as a data package downloaded after data gathering or in one or more burst transmission of any kind.

The positioning module 80 may be configured to utilize one or more sensors to determine a location of the robotic mower 10 and direct continued motion of the robotic mower 10 to achieve appropriate coverage of the parcel 20. As such, the robotic mower 10 (or more specifically, the control circuitry 12) may use the location information to determine a mower track and provide full coverage of the parcel 20 to ensure the entire parcel is mowed. The positioning module 80 may therefore be configured to direct movement of the robotic mower 10, including the speed and direction of the robotic mower 10. Various sensors of sensor network 90 the robotic mower 10 may be included as a portion of, or otherwise communicate with, the positioning module 80 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver and/or accelerometer) may be included to monitor, display and/or record data regarding vehicle position and/or orientation as part of the positioning module 80. In an example embodiment, the sensor network 90 may include an angle sensor 190 that may be configured to determine the turning angle of the robotic mower 10 (or of a set of wheels or individual chassis portion of the robotic mower 10).

The angle sensor 190 may be provided in a number of different forms, some of which will be described in greater detail below. However, in some cases, the angle sensor 190 may be any means such as a device or circuitry embodied in either hardware, or a combination of hardware and software that is configured to determine a turning angle of one chassis portion or set of wheels relative to another chassis portion or set of wheels.

Figure 3:
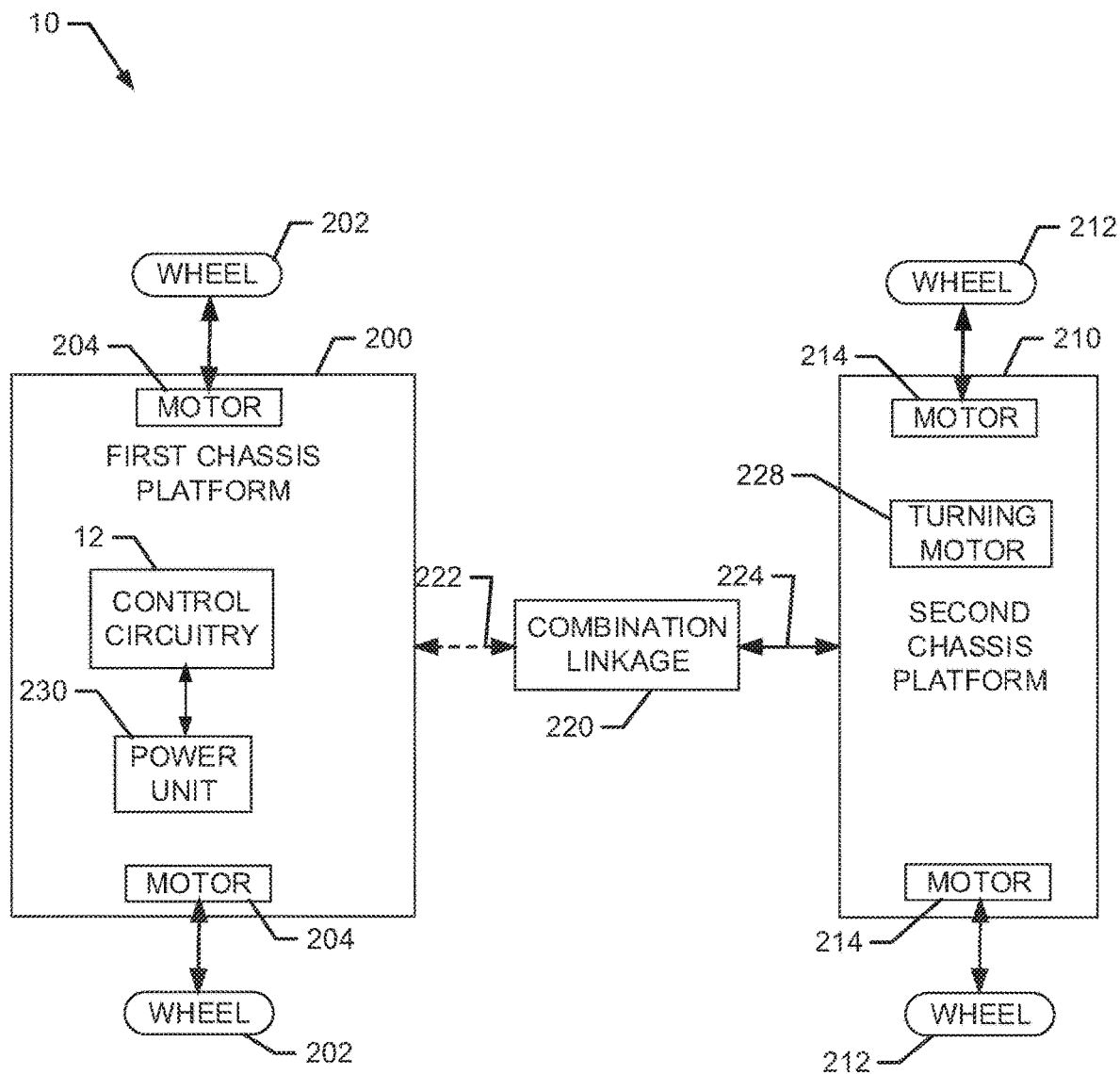
FIG. 3 illustrates a block diagram of various components the robotic mower to facilitate description of some structural components that may be used to implement an example embodiment.

FIG. 3 illustrates a block diagram of some of the components of the robotic mower 10 of an example embodiment. In this regard, as shown in FIG. 3, the robotic mower 10 may include a first chassis platform 200 and a second chassis platform 210. The first and second chassis platforms 200 and 210 may be spaced apart from each other and may be operably coupled to each other via a combination linkage 220. In some embodiments, the first and second chassis platforms 200 and 210 may not contact each other except as provided by the operable coupling via the combination linkage 220.

In an example embodiment, the first and second chassis platforms 200 and 210 may each support one or more wheels. In cases where each of the first and second chassis platforms 200 and 210 supports a corresponding set of two wheels, a first wheel assembly 202 may be provided with individual wheels on opposite sides of the first chassis platform 200 relative to a longitudinal centerline of the robotic mower 10. A second wheel assembly 212 may be provided with wheels on opposite sides of the second chassis platform 210 relative to the longitudinal centerline of the robotic mower 10. The wheel bases of the first and second wheel assemblies 202 and 212 could be the same or different. In an example embodiment, the wheel bases of the first and second wheel assemblies 202 and 212 may be substantially the same as the respective widths of the first and second chassis platforms 200 and 210, respectively. Moreover, in some cases, the widths of the first and second chassis platforms 200 and 210 may be different such that one such platform has a wider width (and therefore wider wheel base) than the other.

In some example embodiments, each wheel of the first wheel assembly 202 may be powered by a single first drive motor (which may be an electric motor in some examples). Each wheel of the second wheel assembly 212 may also be powered by a single second drive motor (which may again be an electric motor). In such examples, power may be deliverable (selectively or continuously) from the respective drive motors to each of the wheels so that the robotic mower 10 has drive power deliverable to all four wheels. Thus, the robotic mower 10 may be considered to be an all-wheel drive (AWD) robotic vehicle.

In an example embodiment, as shown in FIG. 3, each one of the wheels may have its own separate drive motor. Thus, each wheel of the first wheel assembly 202 may be powered by a corresponding drive motor of a first set of drive motors 204 (each of which may be an electric motor). Each wheel of the second wheel assembly 212 may also be powered by a corresponding drive motor of a second set of drive motors 214 (each of which may again be an electric motor). In such examples, power may be deliverable (selectively or continuously) from the respective drive motors to each of the wheels so that the robotic mower 10 has drive power deliverable to all four wheels to again provide an AWD robotic vehicle. It should be appreciated that each drive motor of the first and second sets of drive motors 204 and 214 may be individually controlled (via the control circuitry 12) both for direction of rotation of its respective wheel and for speed of turning. Thus, each wheel can be turned in different directions and at different speeds (or the same direction and same speed) simultaneously. This level of control can enable the control circuitry 12 to intelligently control operation of the wheels for optimal turning based on situational factors associated with the intended route of the robotic mower 10 and the conditions and terrain on which the robotic mower 10 is located.

As can be appreciated from FIG. 3, the control circuitry 12 and the drive motors may be powered via a power unit 230. The power unit 230 may be a rechargeable battery or battery pack that may be supported by one of the first chassis platform 200 or the second chassis platform 210. Although FIG. 3 shows the power unit 230 and control circuitry 12 on the first chassis platform 200, it should be appreciated that the power unit 230 and control circuitry 12 may be provided on the second chassis platform 210 in alternative embodiments. Moreover, in some cases, the power unit 230 may be distributed on both the first and second chassis platforms 200 and 210. When power and control are hosted on one of the chassis platforms, wires or other connections to provide power and/or control to components of the other platform may be provided through or proximate to the combination linkage 220 in some cases. In still other embodiments (see FIG. 12) the power unit 230 and the control circuitry 12 may be on opposite ones of the first and second chassis platforms 200 and 210.

The combination linkage 220 may be used to operably couple the first chassis platform 200 to the second chassis platform 210, as described above. In some embodiments, the combination linkage 220 may be configured to provide a combination of different coupling features within the same structure. The different coupling features may include, for example, a fixed attachment, a non-fixed attachment, an attachment that permits rotation about a turning axis, and/or an attachment that permits pivoting about a pivot axis that may be substantially perpendicular to the turning axis.

As can be appreciated from FIG. 3, the combination linkage 220 may be operably coupled to the first chassis platform 200 via a first link 222 and to the second chassis platform via a second link 224. In an example embodiment, the combination linkage 220 may employ at least two of the above listed coupling features. In this regard, it should be noted that the at least two coupling features that are employed could be employed on the same link or on different links. Thus, for example, the first link 222 may employ both rotation about a turning axis and pivoting about a pivot axis substantially perpendicular to the turning axis. Alternatively, for example, the first link 222 may be an attachment that permits rotation about a turning axis and the second link 224 may be a fixed attachment (i.e., not flexible, but maintaining a fixed orientation between the combination linkage 220 and the second chassis platform 210 during a turn and during straight ahead operation).

In some embodiments, a turning motor 228 may be powered by the power unit 230 and controlled by the control circuitry 12 to facilitate turning of the robotic mower 10 as described in greater detail below. However, turning of the robotic mower 10 can be handled entirely by control of speed and direction of turning of the wheels. Thus, the turning motor 228 could be completely eliminated in some embodiments.

FIG. 4, which includes FIGS. 4A and 4B, illustrates a perspective view of the robotic mower 10 in accordance with one example embodiment. In this regard, FIG. 4A shows the robotic mower 10 being steered for straight ahead driving, while FIG. 4B shows the robotic mower 10 executing a turn. In the example of FIG. 4, the robotic mower is shown having a first housing 300 covering the first chassis platform 200 and a second housing 310 covering the second chassis platform 210. The housings shown in FIG. 4 are merely exemplary, however, and should not be seen as being limiting in any way. That said, it may be desirable to keep the combination linkage 220 covered or out of view, and so the first housing 300 is shown in this example to cover over the combination linkage 220 and also cover at least a portion of the second housing 310. As such, the first housing 300 may remain fixed in its relationship or orientation relative to the combination linkage 220 (even during a turn), but the second housing 310 may vary its orientation relative to the first housing 300 and the combination linkage 220 during a turn.

FIGS. 5 and 6 show two different example structures for employing the combination linkage 220. In this regard, FIG. 5, which includes FIGS. 5A and 5B, illustrates a top view (FIG. 5A) and a perspective view (FIG. 5B) of the robotic mower 10 with the first and second housing portions removed. In FIG. 5, the combination linkage 220 is embodied as a curved member having a C-shape or U-shape that provides a large clearance to enable either of the wheels of the second wheel assembly 212 to freely pass under the combination linkage 220. Meanwhile, FIG. 6, which includes FIGS. 6A and 6B, illustrates a top view (FIG. 6A) and a perspective view (FIG. 6B) of the robotic mower 10 with the first and second housing portions removed to show an alternative combination linkage 220' design. In FIG. 6, the combination linkage 220' is embodied as a relatively straight member that does not provide clearance to enable either of the wheels of the second wheel assembly 212 to freely pass under the combination linkage 220'. Thus, the turn radius is somewhat limited for this example.

Referring to FIG. 5, the combination linkage 220 of this example has a fixed connection to the first chassis platform 200. As such, the combination linkage 220 extends rearward from the first chassis platform 200 toward the second chassis platform 210 along the longitudinal centerline of the robotic mower 10. The combination linkage 220 remains fixed in this orientation relative to the first chassis platform 200. Thus, the first link 222 is fixed (referring to FIG. 3). However, the orientation of the combination linkage 220 relative to the second chassis platform 210 is variable based on the turning status of the robotic mower 10. When the robotic mower 10 is driving straight ahead, each of the wheel assemblies (202 and 212) may receive equal drive power to each wheel. However, when turning, at least some of the wheels may receive drive power unequally (e.g., at differing speeds and/or directions). When turning, the second chassis platform 210 may therefore begin to rotate about a turning axis 400. Thus, the second link 224 (referring to FIG. 3) comprises an attachment that permits rotation about the turning axis 400.

As shown in FIG. 5B, the combination linkage 220 has a C-shape or U-shape that may be formed by respective lift arms that are proximate to the first chassis platform 200 and the second chassis platform 210 respectively. The lift arms may extend upward, substantially parallel to each other and substantially perpendicular to the longitudinal centerline of the robotic mower 10 (normal to the surface of the ground). Meanwhile, a cross-arm may extend between the lift arms to form the base of the C or U inverted relative to the ground (so the open side of the C or U shape points downward). The cross-arm may be substantially perpendicular to each of the lift arms, and parallel to the ground. Each wheel of the second wheel assembly 212 may have a diameter that is less than the height of the cross-arm relative to the ground. Thus, each wheel of the second wheel assembly 212 may be enabled to pass underneath the cross-arm during a turn as shown in FIG. 5B. Thus, for example, either of the wheels of the second wheel assembly 212 may pass between the first chassis platform 200 and the second chassis platform 210. This arrangement enables sharp turns (e.g., 90 degree turns) to be achievable via the robotic mower 10. Moreover, while the common axis of the first wheel assembly 202 is maintained substantially perpendicular to the longitudinal centerline of the robotic mower 10, the common axis of the second wheel assembly 212 is variable and can move between being substantially perpendicular to the longitudinal centerline of the robotic mower 10 and being substantially parallel to the longitudinal centerline of the robotic mower 10 (and past these limits in some cases).

When the combination linkage 220' of FIG. 6 is employed, the second wheel assembly 212 is not allowed to move completely underneath the cross-arm as described above. Thus, as shown best in FIG. 6A, the common axis of the second wheel assembly 212 is still variable, but can only move between being substantially perpendicular to the longitudinal centerline of the robotic mower 10 and being at about a 45 degree angle relative to the longitudinal centerline of the robotic mower 10 (in either direction). Thus, the turn radius of the example of FIG. 6 may be slightly less than the turn radius achievable by the example of FIG. 5.

In some example embodiments, the second link 224 may also be configured to enable pivoting about a pivot axis that is substantially perpendicular to the turning axis. FIG. 7 illustrates how the turning axis and pivot axis are oriented relative to each other in an example embodiment. In this regard, FIG. 7A illustrates the combination linkage 220 connecting the first chassis platform 200 to the second chassis platform 210. The combination linkage 220 includes a cross-arm 240, a first lift arm 242, and a second lift arm 244, that correspond to the respective same components described above. As can be seen in FIG. 7A, the second lift arm 244 couples to a coupling arm 246, which is operably coupled to a turn assembly 250. The coupling arm 246 may be operably coupled to the bottom of the turn assembly 250. The turn assembly 250 allows the second chassis platform 210 to rotate about the turning axis 400, which is substantially perpendicular to the longitudinal centerline of the robotic mower 10. However, the operably coupling of the coupling arm 246 and the turn assembly 250 further enables the second chassis platform 210 to pivot about a pivot axis 410 that is substantially perpendicular to the turning axis 400.

In an alternative embodiment, depicted in FIG. 7B, the combination linkage may include two combination linkage arms 220a and 220b. The combination linkage arms 220a, 220b maybe operably coupled to coupling arm 246, which, in turn, may be operably coupled to the top of the turn assembly 250.

In an example embodiment, the second chassis platform 210 may be enabled to rotate as much as 360 degrees around the turning axis 400. However, the range of motion about the pivot axis 410 may be substantially less. In this regard, in some cases, the amount of pivoting about the pivot axis 410 may be limited to about +/−5 degrees or a maximum of +/−10 degrees side to side. FIG. 8, which includes FIGS. 8A and 8B, shows examples of how pivoting about the pivot axis 410 allows the common axis of the first wheel assembly 202 and the common axis of the second wheel assembly 212 to be in different planes due to the ability of the second chassis platform 210 to pivot about the pivot axis 410. This may provide for enhanced terrain following and contact of the first and second wheel assemblies 202 and 212 regardless of terrain. In this regard, a differential plane angle α may be defined between the common axis of the first wheel assembly 202 and the common axis of the second wheel assembly 212.

FIG. 9A illustrates a cross section view of the turn assembly 250 to facilitate a description of how the rotation about the turning axis 400 and pivot axis 410 may be accomplished in accordance with one example embodiment. As shown in FIG. 9A, the turn assembly 250 may include the angle sensor 190 (or turning sensor) mounted at the end of a turning shaft extension 420 that extends from a turning shaft 422 that connects to the coupling arm 246. The turning shaft 422 may be substantially perpendicular to the coupling arm 246 and may be substantially parallel to the second lift arm 244. The angle sensor 190 may be configured to monitor the orientation of the second chassis platform 210 relative to the first chassis platform 200 and/or the longitudinal centerline of the robotic mower 10 (or the combination linkage 220).

The turning sensor 190 may be provided proximate to a fixed bracket 260 inside which an electric brake 262 may be housed. The electric brake 262 may be applied to lock the turning shaft 422 and/or the turning shaft extension 420 at a particular turning angle based on information indicating the current turning angle as determined by the angle sensor 190. Thus, for example, when the electric brake 262 is unlocked, the second chassis platform 210 may be free to rotate about the turning axis 400 to execute turns or insert a turning angle to position the second chassis platform 210 at a desirable angle or orientation relative to the first chassis platform 200. When driving straight or otherwise attempting to maintain a particular turning angle, the electric brake 262 may be applied, e.g., under the control of the control circuitry 12, to prevent further rotation about the turning axis 400. In an example embodiment, the control circuitry 12 may compare the current turn angle to a target turn angle. The control circuitry 12 may applies the electric brake 262 in response to the current turn angle satisfying a turn angle divergence threshold, for example zero or one degree divergence from the target turn angle. Similarly, the control circuitry 12 releases the electric brake 262 in response to the current turn angle failing to satisfy the turn angle divergence threshold.

The turning shaft 422 may be enabled to pivot about the pivot axis 410 due to the turn assembly 250 allowing a certain amount of "play" relative to the pivot axis 410 to accommodate for terrain and slope changes. In this regard, a bearing assembly 430 (see FIG. 10) may be provided that allows the turning shaft 422 to move, at least to some degree, about the pivot axis 410. In particular, the turn assembly 250 (and more particularly the bearing assembly 430 thereof) may include a pivot bearing housing 270 to house pivot bearings 272 oriented to allow pivoting about the pivot axis 410 and a turn bearing housing 280 to house turn bearings 282 disposed along the turning shaft 422 to support rotational movement of the turning shaft 422. As such, the pivot bearing housing 270 may be assembled to screw bosses of the turn bearing housing 280 to enable the pivot bearing housing 270 to pivot (e.g., about +/−5 degrees). The pivot bearing housing 270 and the second chassis platform 210 may therefore both be enabled to rotate and pivot responsive to movement of the second chassis platform 210 over sloped or uneven ground while turning or driving straight ahead.

Although in some cases, turning of the second chassis platform 210 could be accomplished by individually controlling speed and/or direction of drive power provided to at least some of the wheels of the first and second wheel assemblies 202 and 212, in some embodiments, the turning angle can be adjusted directly via a separate component (e.g., the turning motor 228).

FIG. 9B illustrates a perspective view of the turn assembly 250 in accordance with one example embodiment. The electric brake 262 may include an electromagnet 262' and a brake disc 263. The electromagnet 262' may rotate about the turning axis 400 with the second chassis platform 210. The brake disc 263 may be stationary relative to the turning axis 400 and extend around the turning axis to at least the maximum turning direction, for example at least 180 degrees.

FIG. 9C illustrates a perspective view of the electric brake and turn assembly in accordance with an example embodiment. The electromagnet 262' may be operably coupled, e.g. riveted, screwed, welded, or the like, to fixed mount 260. The fixed mount 260 may be operably coupled to the second chassis platform 210, such that the fixed mount and electromagnet 262' may turn in response to the turning of the second mounting chassis platform. The brake disc 263 may operably coupled to a disc mounting plate 265. The disc mounting plate 265 may be operable coupled to the pivot 270, such that the disc mounting plate 265 and brake disc 263 are stationary relative to the turning axis 400.

In one example embodiment, the brake disc 269 may include a guide, such as a guide rod 269 and aperture 269'. The guide rod 269 may extend from the disc mounting plate 265 through the aperture 269' allowing brake disc 263 to move toward and away from the electromagnet 262', while being stationary relative the turning axis 400, as depicted by arrow F1. In some example embodiments, the guide rod 269 penetrates the aperture 269' but does not penetrate the brake plane, e.g. the surface of the brake disc 263 which faces the electromagnet 262'. The electromagnet 262' may engage the brake disc 263 at any point, e.g. as the electromagnet moves it may engage the point of the brake disc which is presently facing the electromagnet.

In an example embodiment, the electric brake 262 is an electropermanent magnet as discussed below in FIG. 9D. In some example embodiments, the electric brake 262 is a friction brake. In an instance in which the electric brake 262 is a friction brake, the electric brake may apply a brake pad to the brake disc 263 generating a frictional force sufficient to limit or prevent unintentional turning of the second chassis platform 210. In another example embodiment, the electric brake 262 may be a caliper brake. In an example embodiment in which the electric brake 262 is a caliper brake, the caliper may travel on either side of the brake disc 263 as the electric brake moves about the turning axis 400 with the second chassis platform. Actuation of the caliper may be applied by an electric motor, or servo, applying tension to the caliper which, in turn, applies force to either side of the brake disc 263. The force applied to either side of the brake disc 263 may be sufficient to limit or prevent unintentional turning of the second chassis platform 210. In further example embodiments, the electric brake 262 may be a solenoid actuated locking pin. In an example embodiment in which the electric brake 262 is a solenoid actuated locking pin, the brake disc 263 may have one or more apertures or recesses. In an instance in which the locking pin is actuated, the locking pin may engage at least one of the apertures of recesses, thereby limiting or preventing unintentional turning of the second chassis platform 210. One of ordinary skill in the art would immediately appreciate that electric brakes described herein are for illustrative purposes and other brakes beyond those disclosed may be used to provide steering stability in robotic vehicles, such as mowers.

FIG. 9D illustrates a diagram of an electric brake 262 in accordance with an example embodiment. The electric brake 262 may include a electromagnet 902 and a brake disc 263. In an example embodiment, the electromagnet 902 may be an electropermanent magnet. The electromagnet 902 may include two plates 906, and a first permanent magnet 908, a second permanent magnet 910, and a winding 912. The first permanent magnet 908 may be a material with a relatively low intrinsic coactivity, such as 50 A/m, for example AlNiCo (Alnico). The second permanent magnet 910 may be a material with a relatively high intrinsic coercively, such as 1120 A/m, for example NdFeB (neodymium). The two plates 906 and brake disc 904 may be a soft magnet, Hiperco. The coil 912 may be wrapped around one or both permanent magnets 908, 910, and operably coupled to a power supply which may be selectively applied, such as by a solenoid operably coupled to the control circuitry 12.

The first and second permanent magnets 908, 910 may be oriented, such that the north end of each magnet is operably coupled to opposing plate 906. The plates 906 may channel the magnetic flux through the brake disc 904, causing the brake disc to be pulled and move towards the electromagnet 902. The magnetic flux channeled through the plates 906 and the brake disc 263 may apply a significant magnetic force between the electromagnet 902 and brake disc, for example 50-100 N. The magnetic force may be sufficient to limit or prevent unintentional turning of the second chassis platform 210. As described, the electric brake 262 is normally locked or applied, without a current being applied to the winding 612.

In an instance in which, the control circuitry 12 determines a change in turn angle is desired, the electric brake 262 may be unlocked or released. An electric current may be applied to the winding 912, causing an electromagnetic field to be induced, opposite of the magnetic field of the first permanent magnet 908. In an example embodiment, the electric current may be continuously applied while the break is released or may be a pulse. The magnetic field of the first permanent magnet 908 may be reversed by the electromagnetic filed of the winding 912, such that the north ends of the first and second permanent magnets 908, 910 are operably coupled to the same plate 908. The magnetic flux or field may be focused by the plates 906 through the air around the electromagnet 902. The brake disc 263 may move away from the electromagnet 902 due to the magnetic force and/or gravitational force, releasing the electric brake 262 and allowing turning of the second chassis platform about the turning axis 400. In some example embodiments, in an instance in which the brake is released, a gap may be provided between the brake disc 263 and the electromagnet 902 limiting or preventing wear of the brake disc 263 when as the electromagnet 902 moves about the turning axis.

In an embodiment in which the first permanent magnet 908 magnetic field is reversed by a electromagnetic field pulse induced by an application of current to the winding 912 in a first direction, the magnetic field of the permanent magnet may be reversed to the first orientation by application of current to the winding in a second direction opposite to the first direction. In an embodiment in which the first permanent magnet 908 magnetic field is reversed by continued application of an electromagnetic field induced by a continuous application of current to the winding 912, the magnetic field of the permanent magnet may be reversed to the first orientation by interrupting application of current to the winding. The return of the first permanent magnet 908 to an orientation opposite of the second permanent magnet may lock or apply the electric brake 262, causing the magnetic field to engage the brake disc 263, as discussed above.

Although the operation of the electropermenant magnet was as normally locked, e.g. locked when deenergized, one of ordinary skill in the art would immediately understand that the electropermenat magnet may be configured to be normally unlocked, e.g. locked when energized.

Additionally or alternatively, friction of a gear box on the turning motor 228 may be utilized to maintain the turning angle. In some example embodiments, the turning motor 228 may be a step motor. Coils of the step motor may be energized to maintain a position of the step motor and therefore maintain the turning angle. In an example embodiment, the electric brake 262 may include a plunge or rod and the brake disc 263 may include one or more apertures. The solenoid may be actuated to cause the plunge or rod to penetrate an aperture of the disc brake locking the electric brake 262.

FIG. 9E illustrates an example electric brake 262 according to an example embodiment. The electric brake 262 may include a solenoid configured to pivot a locking lever 268. The locking lever 268 may pivoted to engage the brake disc 263. Friction between the locking lever 268 and the brake disc 263 may maintain the turning angle. In an example embodiment, the locking lever 268 and/or the brake disc may include V grooves on the engagement surface to increase friction.

FIG. 9F illustrates an example electric brake 262 according to an example embodiment. The electric brake 262 may include a solenoid configured to pivot a locking lever 268 similar to the electric brake discussed above in reference to FIG. 9E. The locking lever may be configure to push or withdraw a plunge or rod from one or more apertures in the brake disc 263, as discussed in reference to FIG. 9D. In an example embodiment, the plunge or rod may be returned to a non-actuated position by a return spring 267.

FIG. 9G illustrates an example turning motor gear drive according to an example embodiment. In an alternative embodiment, the turning motor 228 and the electric brake 262 may be replaced with a turning motor gear drive. The turning motor gear drive may include an electric drive motor 245 and a worm gear assembly 275 configured to turn about the turning axis 400. The friction of the worm gear assembly 275 may maintain the turning angle set by the electric drive motor 245.

FIG. 10A illustrates a cross section view of a portion of the second chassis platform 210 of an example embodiment, to illustrate how the turning motor 228 may be implemented in some cases. As shown in FIG. 10, the turning motor 228 may be operably coupled to a gear motor 290 to turn the gear motor 290 responsive to input from the control circuitry 12. The gear motor 290 may be operably coupled to a gear assembly 292 that is operably coupled to the turning shaft 422. Thus, by operation of the turning motor 228, the turning shaft 422 may be positioned or turned about the turning axis 400. Moreover, the turning motor 228 may be employed to turn the turning shaft 422, and the angle sensor 190 may monitor the turning angle achieved by the operation of the turning motor 228. When the desired turning angle is achieved, the angle sensor 190 may detect the achieved turning angle and inform the control circuitry 12, the control circuitry 12 may then direct the turning motor 228 to stop turning, and may engage the electric brake 262 as described above. Thus, precise turning angles may be achieved and maintained under the control of the control circuitry 12.

FIG. 10B illustrates a cross section view of a portion of the second chassis platform 210 of an example embodiment, to show how the turn assembly 250 may be implemented in an alternative embodiment, as described in FIG. 7B above. The turn assembly 250 may be substantially similar to the turning assembly discussed above in reference to FIG. 9A-10. The turn assembly 250 may be oriented such that the turning sensor 190 is near the bottom of the turn assembly 250 and the turning shaft 422 is near the top of the turn assembly 250. In an example embodiment, the turn assembly 250 may be external to the second housing 310. The turn assembly 250 may include a cover such as a plastic cover, to protect the turn assembly from impact damage from water or debris.

The coupling arm 246 of the combination linkage 220 may be operably coupled to the turning shaft 422. The turn assembly 250 may be operably coupled to a pivot arm 248, which in turn, may be operably coupled to the second chassis platform 210 via pivot shaft 247. In some embodiments, the pivot arm may include pivot stops 249 to limit the pivot travel of the pivot arm 248.

FIG. 11, which includes FIGS. 11A and 11B, shows a cross sectional view of the robotic mower 10 with housings attached (FIG. 11A) and with the housings removed (FIG. 11B) to illustrate some components of an example embodiment. FIG. 12 illustrates a perspective view of the robotic mower 10 with cover portions of the chassis platforms further removed to illustrate some components of an example embodiment. Referring to FIGS. 11 and 12, the first housing 300 and the second housing 310 may each be operably coupled to the first and second chassis platforms 200 and 210, respectively, via body suspension mounts 500. The first and second housing portions 300 and 310 may provide for a desirable aesthetic appearance of the robotic mower 10, and also protect internal components thereof from weather, impact or other undesirable events. In an example embodiment, the turning shaft 422 may be sealed with a rubber bellows to allow for the pivoting movement of the second chassis platform 210. The turning shaft 422 may also be sealed with a felt sealing material to allow for turning movement of the second chassis platform 210.

The combination linkage 220 is shown as having a fixed connection (e.g., shown by first link 222) to the first chassis platform 200. However, the turning shaft 422 allows the second chassis platform 210 to rotate (or be rotated) to a desired angle that can be monitored by the angle sensor 190. The electric brake 262 can be employed to lock in a particular or desired angle (or at least apply a torque to inhibit or resist movement of the turning shaft 422), as described above. In the example of FIG. 12, the power unit 230 is provided at the second chassis platform 210. Meanwhile, a cutting unit 510 may be powered by the power unit 230, but supported at the first chassis platform 200. Drive motors (e.g., first set of drive motors 204) may be housed proximate to the respective wheels that they power. The drive motors are also powered by the power unit 230 and under control from the control circuitry 12. A main board 520, which may embody the processing circuitry 12 in some cases, may be provided at the first chassis platform 200.

The scale of the robotic mower 10 may be adjustable in some cases, due to the optimal and fundamental nature of the design concepts that some of the examples described herein embody. Thus, for example, the wheel bases and sizes of the first and second chassis platforms 200 and 210 may be increased to support the cutting unit 510 and any desirable number of cutting blades from one to multiple such blades.

As discussed above, the robotic mower 10 of an example embodiment may be enabled to have a relatively tight turning radius. FIG. 13 illustrates a top view of the robotic mower 10 executing a turn in accordance with an example embodiment. As shown in FIG. 13, the turning axis 400 defines the axis about which the second chassis platform 210 rotates relative to the longitudinal centerline 600 of the robotic mower 10, when the robotic mower 10 executes a turn. When the second chassis platform 210 rotates to create a turn, the turn may be executed in the manner shown in FIG. 13. In this regard, due to the sharpness of the turning angle defined by the amount of rotation of the second chassis platform 210 about the turning axis 400, the second wheel assembly 212 may define two respective circular paths for the wheels of the second wheel assembly 212. An outer rear wheel turn radius 610 is shown in FIG. 13 along with an inner rear wheel turn radius 620. The outer rear wheel turn radius 610 may be considered to define the smallest or tightest turn radius for the robotic mower 10.

While the second chassis platform 210 follows the outer rear wheel turn radius 610 and the inner rear wheel turn radius 620 as shown, the first wheel assembly 202 also defines a circular path for the outer wheel of the first wheel assembly 202. The inner front wheel of the first wheel assembly 202 generally pivots about the center point of turning 640, which is the center of all the turn radiuses shown in FIG. 13. The outer front wheel turn radius 630 is shown in FIG. 13 to intersect the turning axis 400, but this is not necessarily always the case.

As can be appreciated from FIG. 13, the inner rear wheel of the second wheel assembly 212 is allowed to pass in between the first chassis platform 200 and the second chassis platform 210 and under the combination linkage 220 to achieve the relatively tight turn that is shown. When this turn is executed, the common axis 650 of the first wheel assembly 202 remains substantially perpendicular to the longitudinal centerline 600 of the robotic mower 10. However, the common axis 660 of the second wheel assembly 212 changes due to the rotation about the turning axis 400.

As indicated above, the control circuitry 12 may sometimes control the provision of directions to the robotic mower 10 to direct the robotic mower 10 to traverse all or portions of the parcel 20 of FIG. 1. In some cases, the control circuitry 12 may further be involved in providing specific control instructions to control turning of the robotic mower 10 to achieve optimal results. In this regard, when a robotic vehicle (like the robotic mower 10) is powered by 3 or 4 wheels, the provision of power to each of the wheels individually allows for a high level of control relative to both steering and to maintaining traction on rough or uneven terrain. As can be appreciated from the discussion above, the center point of any turn will depend upon the center axes of the wheels. In particular, the location or position of the center point changes depending on the angle of rotation of the second chassis platform 210, and each wheel follows its own turning radius. Slippage of any one of the wheels could tear the grass, thus it may be desirable to try to limit such slippage. By employing the angle sensor 190, the geometry involved in turning of the robotic mower 10 can continuously be monitored and/or controlled. The speed of the wheels, direction of turning of the wheels, and/or the turning angle (e.g., via control of the turning motor 228) may all be potentially controllable parameters to influence turning or optimize turning.

In an example embodiment, the angle sensor 190 may be configured to detect the turning angle and provide an indication of the same to the control circuitry 12. The control circuitry 12 may then interface with the turning motor 228 and/or the first and second sets of drive motors 204 and 214 to regulate speeds and/or angles accordingly. When controlling speeds, the variable wheel speeds may be calculated based on geometric formulas and the input from the angle sensor 190. When the robotic mower 10 is driving straight forward, all wheels may be driven at the same speed. However, when a turn is executed based on speed control (e.g., not using the turning motor 228), one or more of the wheels may be operated at different speeds and/or directions.

FIG. 14 illustrates a conceptual representation of the robotic mower to show various geometric values that are used in calculations for use in conducting turning operations in accordance with an example embodiment. Relative to FIG. 14, the following terms are defined:

$wb_f$=wheelbase front
$wb_r$=wheelbase rear
$a_f$=axle length front
$a_r$=axle length rear
$\alpha$=angle between vertical (i.e., longitudinal centerline) and $a_r$
$\beta = (\pi/2) - \alpha$ Based on trigonometry, the following equations may be applicable relative to determining turn radiuses for each wheel:

$$bc = a_f + \frac{a_r}{\cos \alpha}$$

$$ab = bc * \tan \alpha \to ab = \left(a_f + \frac{a_r}{\cos \alpha}\right) * \tan \beta \to ab =$$

$$a_f * \tan \beta + \frac{a_r}{\cos \alpha} * \tan \beta \to ab = a_{fg} * \tan \beta + \frac{a_r}{\cos \alpha} * \frac{\sin \beta}{\cos \beta} \to$$

$$\left(\text{since } \alpha = \frac{\pi}{23} - \beta \text{ and } \cos\left(\frac{\pi}{2} - \theta\right) = \sin \theta\right) \to ab =$$

$$a_f * \tan \beta + \frac{a_r}{\sin \beta} * \frac{\sin \beta}{\cos \beta} \to ab = a_f * \tan \frac{a_r}{\cos \beta}$$

$$ac = \frac{bc}{\cos \beta} - \frac{a_r}{\tan \beta}$$

When $\alpha$ is not zero, the wheel radiuses may then be determined based on:

$$\text{Left front wheel} = ab + \frac{wb_f}{2} * sgn(a)$$

$$\text{Right front wheel} = ab - \frac{wb_f}{2} * sgn(a)$$

$$\text{Left rear wheel} = ac + \frac{wb_r}{2} * sgn(a)$$

$$\text{Right rear wheel} = ac - \frac{wb_r}{2} * sgn(a)$$

Using the formulas above, when the angle $\alpha$ is zero, each wheel may run at the same speed to achieve straight running. By finding the largest radius of the four, and dividing each wheel with this a ratio is found. Vehicle speed can then be multiplied by the ratio for each wheel to keep the vehicle traveling with the determined radius. Thus, the calculations above may be used to determine speed/direction to employ for sensor controlled wheel steering of an AWD robotic vehicle.

When running, the turning angle may be monitored to either maintain or change the angle between the first chassis platform 200 and second chassis platform 210. Similarly, forward and rearward movement of each wheel relative to corresponding impacts on the turning angle may also be monitored as described above. However, any or all of speed, direction and angle can be monitored and controlled in some cases. FIG. 15 illustrates a conceptual representation of the robotic mower to show various geometric values that are used in calculations for use in conducting turning operations in accordance with an example embodiment.

In an example embodiment, geometric calculations may be continuously performed by the control circuitry 12 to enable real time control of the steering of the robotic mower 10. In particular, various static measurements (e.g., axis lengths, wheel radius, etc.) and the turning angle may be monitored along with speed to provide control (via the processing circuitry 12) directed to achieve a target speed and target angle. The difference between the current turning angle and the target turning angle may be scaled and adjusted to a suitable angular velocity ($w_r$).

Accordingly, calculations for changing the angle between the first chassis platform 200 and the second chassis platform 210 may be accomplished using the definitions and equations discussed below. Within this context, a change in turning angle (e.g., the angular difference between the heading of the first chassis platform 200 (which is fixed as the longitudinal centerline) and the heading of the second chassis platform 210 (which is variable and is perpendicular to the common axis of the second wheel assembly)) may be accomplished by rotating the second chassis platform 210 around the turning axis 400. The center of rotation is fixed in position during the rotation. Rotating the rear chassis will move the front chassis according to the calculations below:

$wb_f$=wheelbase front
$wb_r$=wheelbase rear
$a_f$=axis length front
$a_r$=axis length rear
v=angle of the turning axis
$w_r$=angular velocity rear
$\alpha$=angle between $\vec{\beta}_{rot}$ and $\vec{\beta}_{tot}$
$\beta$=angle between $\vec{\beta}_{rev}$ and $\vec{\beta}_{tot}$ The speeds of the rear wheels are enabled to be calculated from the wheelbase rear value above since the center of rotation is in the middle of that corresponding axis.

$$\text{Left rear wheel} = -w_r * \frac{wb_r}{2}$$

$$\text{Right rear wheel} = w_r * \frac{wb_r}{2}$$

For calculating the movement of the front wheels, movement of the point B may first be calculated: $\|\vec{B}_{tot}\| = \omega_r * a_r$. The movement can be split into two orthogonal parts: $\vec{B}_{tot} = \vec{B}_{rot} + \vec{B}_{rev}$ where $\vec{B}_{rot}$ is a rotation of the front wheel axis and $\vec{B}_{rev}$ is a movement backwards (reversing). Using these terms, front wheel movement can be determined as:

$$\text{Left front wheel} = -\|\beta_{rev}\| + \|\beta_{rot}\| * \frac{wb_f}{2 * a_f}$$

$$\text{Right front wheel} = -\|\beta_{rev}\| - \|\beta_{rot}\| * \frac{wb_f}{2 * a_f}$$

Projection gives the lengths of $\vec{B}_{rot}$ and $\vec{B}_{rev}$:

$$\|\beta_{rev}\| = \|\beta_{tot}\| * \cos(\beta)$$

$$\|\beta_{rot}\| = \|\beta_{tot}\| * \cos(\alpha)$$

$$\alpha = v$$

$$\beta = \frac{\pi}{2} - v$$

Where $$\text{Left front wheel} = -\omega_r * \bar{u}_r * \sin v + w_r * \bar{u}_r * \cos v * \frac{wb_f}{2*a_f}$$

$$\text{Right front wheel} = -w_r * \bar{u}_r * \sin v - w_r * \bar{u}_r * \cos v * \frac{wb_f}{2*a_f}$$

Which gives:

By inputting measurements such as $wb_f$, $a_f$, etc., into these calculations, the angle between the chassis (v) and the desired angular velocity of the rear chassis $\omega_r$ can be determined. A simplification of the calculations may involve setting $\omega_r$ equal to 1 for the calculations, and then scaling the output to a desired angular velocity. By calculating speed for driving each wheel as described above, wheel slip can be avoided or at least the chances of wheel slip can be reduced significantly. Accordingly, it may be less likely that any tearing of grass occurs.

In some embodiments, while transiting the parcel 20, the robotic mower 10 may encounter slopes of various degrees. Given the small turning radius that the robotic mower 10 is capable of achieving, the risk of rolling the robotic mower 10 over may increase on certain slopes if a waist angle is greater than 90 degrees. In this regard, the risk of rolling over may depend at least in part on the relationship between the center of gravity of the robotic mower and the amount of the slope.

FIG. 16, which includes FIGS. 16A and 16B, illustrates a relationship between a center of gravity 700 and a contact line passing through the point at which each of the lower (in elevation) wheels contacts the ground. This point, referred to as intersection point 710, changes when the wheels are oriented with different turning angles. In FIG. 16A, a top view of the robotic mower 10 is shown with the contact line 720 also being shown relative to the center of gravity. In the example of FIG. 16A, the intersection point 710 is farther away from the center of gravity 700 since the wheels are all oriented for straight ahead driving. However, when the wheels of the second chassis platform 210 are turned 90 degrees as shown in FIG. 16B, the contact line 710 and the intersection point 720 are drawn closer to the center of gravity 700. Where there is no slope, neither of these orientations provides a rollover risk. However, if the slope increases, this may change.

FIG. 17, which includes FIGS. 17A and 17B, illustrates a front perspective view of the same situations in FIGS. 16A and 16B respectively, except on a given slope. FIG. 18, which includes FIGS. 18A and 18B, illustrates a front perspective view of the robotic mower 10 on a larger slope than that shown in FIG. 17, and having wheels turned 90 degrees in FIG. 18A and only 45 degrees in FIG. 18B. It should be understood that in the context of FIGS. 16-18, whenever the intersection point 720 remains outside (or right in this view) of the center of gravity 700, the robotic mower 10 will have a low rollover risk. An offset value may therefore be defined and represented by the distance $D_{off}$ in FIGS. 17 and 18. As can be appreciated from the example of FIG. 17, the magnitude of $D_{off}$ is larger in FIG. 17A than it is in FIG. 17B. Meanwhile, in the example of FIG. 18A, $D_{off}$ is actually a negative value since the intersection point 720 has moved inside (or left in this view) of the center of gravity 700. Thus, the rollover risk is high in FIG. 18A. However, on the same slope, by reducing the turning angle to 45 degrees instead of 90 degrees, $D_{off}$ is returned to a positive value, and the rollover risk is again reduced. Accordingly, by monitoring the slope on which the robotic mower 10 is operating, it may be possible to control the turning angle to ensure that smaller turning angles are used on larger slopes so that the risk of rollover can be maintained at low levels. In an example embodiment, the sensor network 90 may include an accelerometer that may be configured to determine the orientation of the robotic mower 10 so that the slope on which the robotic mower 10 is operating can be determined. After the slope is determined, the control circuitry 12 may impose turning angle limits to prevent rollover.

The waist angle may be defined as the angle between a line along a horizontal plane pointing into the sloped terrain and a line extending from the intersection point 720 and the center of gravity 700. Thus, it can be appreciated that the waist angle is less than 90 degrees in FIGS. 17A, 17B, and 18B, but is greater than 90 degrees in FIG. 18A.

Embodiments of the present invention at it relates to steering control may therefore be practiced using an apparatus such as the one depicted in FIGS. 2-3, in connection with the system of FIG. 1. As such, it should also be appreciated that some embodiments may be practiced in connection with a computer program product for performing embodiments or aspects of the present invention by controlling execution of one or more methods associated with performing example embodiments. FIGS. 19 and 20 each illustrate a block diagram of an example method for controlling operation of the robotic mower in accordance with an example embodiment. Each block or step of the flowcharts of FIGS. 19 and 20, and combinations of blocks in the flowcharts, may be implemented by various means, such as hardware, firmware, processor, circuitry and/or another device associated with execution of software including one or more computer program instructions. Thus, for example, one or more of the procedures described herein may be embodied by computer program instructions, which may embody the procedures described above and may be stored by a storage device (e.g., memory 114) and executed by processing circuitry 110 (e.g., including by processor 112).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIG. 19 or 20. Moreover, other methods derived from the descriptions provided herein may also be performed responsive to execution of steps associated with such methods by a computer programmed to be transformed into a machine specifically configured to perform such methods.

In an example embodiment, a method for providing steering control of a robotic vehicle may include receiving an indication of a target turning angle at operation 800. The target turning angle may be generated based on turns required to follow a programmed route, instructions received from a steering algorithm, remotely provided instructions, and/or the like. An indication of the current turning angle may then be received at operation 802. The current turning angle may be provided (e.g., by the angle sensor 190) continuously, periodically, or in response to various events. Upon receiving the target turning angle and the current turning angle, a determination may be made at operation 804 as to whether there is a difference between the two. If there is no difference, in some cases the electric brake may then be applied to lock in the current turning angle at operation 806. If there is a difference, then the electric brake may be released at operation 808.

A turning angle modification may then be calculated at operation 810. The turning angle modification may be calculated, at least in part, based on the calculations discussed above in connection with the description of examples corresponding to FIGS. 14 and 15. As such, for example, the turning angle modification may include the determination of an optimal speed/direction modification and/or turning motor input to achieve the desired turning angle to conduct the turn needed to follow the programmed route, received instructions or steering algorithm input.

In some cases, information indicative of the current inclination may also be received at operation 812. A comparison may then be made to determine whether the current inclination exceeds a predefined threshold inclination at operation 814. If the current inclination is below the threshold inclination, then the turning angle may be controlled based on the calculated turning angle modification at operation 816. If the current inclination is above the threshold inclination, then a limit may be applied to the turning angle modification at operation 818. Regardless of whether a limit needs to be applied, flow may proceed to implementation of steering control based on the calculated (and/or limited) turning angle modification at operation 820.

The implementation of steering control may be accomplished in a number of ways. FIG. 20 illustrates an example of one such way in which such steering control may be achieved. In the example of FIG. 20. In some cases, an indication may be provided regarding the calculated (or limited) turning angle modification at operation 822 and a determination may be made as to whether the turn will be conducted with the aid of the turning motor at operation 824. If assistance from the turning motor is not to be used, then calculations may be made (e.g., involving the calculations discussed above in connection with the description of examples corresponding to FIGS. 14 and 15) to determine what speed and/or direction to employ for the wheels to conduct speed based turning at operation 826. The calculated speeds/directions may then be employed until the current turning angle reaches the target turning angle at operation 828. Of course, if no turning motor is employed at all, the method may simply skip operation 824 and proceed directly to operation 826.

If turning motor assistance is to be employed, then power may be applied to the turning motor to start implementing a turning angle (as described above) at operation 830. If it is possible to combine speed control with turning motor operation, then a determination may be made as to whether to combine both at operation 832. If the combination will not be employed, then power may be applied to the turning motor until the current turning angle reaches the target turning angle at operation 834. In examples in which turning is done exclusively with the turning motor, operations 822, 830 and 834 may simply be executed in order.

If both speed control and turning motor operation are desired and possible, then speed control calculations may be performed at operation 836 after operation 832. Thereafter, both speed/direction control and turning motor operation may be applied until the current turning angle reaches the target turning angle at operation 838.

In an example embodiment, an apparatus for performing the methods of FIGS. 19 and 20 above may comprise processing circuitry (e.g., processing circuitry 110) that may include a processor (e.g., processor 112) configured to perform some or each of the operations (800-838) described above. The processing circuitry 360 may, for example, be configured to perform the operations (800-838) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (800-838) may comprise, for example, the processing circuitry 110.

In some embodiments, the features described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, in an example embodiment, the robotic vehicle may also include an angle sensor mounted proximate to the turning axis to monitor a turning angle of the second chassis platform relative to the first chassis platform, the angle sensor providing information indicative of the turning angle to the processing circuitry to enable the processing circuitry to employ a steering control based on the turning angle. In some example embodiments, of the robotic vehicle, the processing circuitry compares a current turn angle to a target turn angle and the processing circuitry applies the electric brake in response to the current turn angle satisfying a turn angle divergence threshold and the processing circuitry releases the electric brake in response to the current turn angle failing to satisfy the turn angle divergence threshold. In an example embodiment, the robotic vehicle also includes a turning motor configured to interface with a turning shaft of the linkage to apply a rotational force to the turning shaft to turn the second chassis platform relative to the first chassis platform responsive to control from the processing circuitry and the processing circuitry is configured to release an electric brake prior to applying the rotational force and apply the electric brake whenever the rotational force is not applied.

In some example embodiments of the robotic vehicle the electric brake is deenergized when applied and energized when released. In an example embodiment of the robotic vehicle, the electric brake includes a brake disc and an electromagnet configured to engage the brake disc when applied. In some example embodiments, of the robotic vehicle, the brake disc and electromagnet comprise an electropermanent magnet. In an example embodiment of the robotic vehicle, the brake disc is a soft magnet. In some example embodiments of the robotic vehicle, in response to the electromagnet being energized a magnetic field is reversed. In an example embodiment of the robotic vehicle, the brake disk is physically connected to a guide rod allowing the brake disc to travel in response to the application of the electric brake, toward the electric brake, and in response to the release of the electric break, away from the electric brake. In some example embodiments of the robotic vehicle, the guide rod penetrates the break disc but does not penetrate a plane in which a surface facing the electromagnet lies. In an example embodiment of the robotic vehicle, the electromagnet is configured to rotate about the turning axis responsive to the second chassis platform turning about the turning axis and the electric brake is stationary relative to the turning axis and the electromagnet aligns with different points of the brake disc at different points of rotations about the turning axis.

In some example embodiments of the robotic vehicle, the brake disc extends around the turning axis to at least a maximum turning angle of the second chassis platform. In an example embodiment of the robotic vehicle, the brake disc extends at least 180 degrees around the turning axis. In some example embodiments of the robotic vehicle, the brake disc is forced to a first position in response to the electric brake being applied and moves to a second position in response to the electric brake being released.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A robotic lawn mower comprising:
   a first chassis platform comprising a first wheel assembly;
   a second chassis platform comprising a second wheel assembly, the first and second chassis platforms being spaced apart from each other; and
   a combination linkage operably coupling the first and second chassis platforms,
   wherein the combination linkage is operably coupled to the first chassis platform via a first link and is operably coupled to the second chassis platform via a second link;
   wherein the combination linkage employs a first coupling feature and a second coupling feature, each of the first and the second coupling feature configured to operably couple the first and second chassis platforms;
   wherein the first coupling feature comprises an attachment configured to rotate about a turning axis, and the second coupling feature comprises at least one of a fixed attachment or an attachment configured to pivot about a pivot axis that is substantially perpendicular to the turning axis, the turning axis being defined as an axis about which the first chassis platform or the second chassis platform rotates during a change in a heading of the robotic lawn mower.

2. The robotic lawn mower of claim 1, wherein the first link comprises the second coupling feature of the fixed attachment extending the combination linkage rearward from the first chassis platform along a longitudinal centerline of the robotic lawn mower, and wherein the second link comprises the first coupling feature.

3. The robotic lawn mower of claim 2, wherein the second link further comprises the second coupling feature of the attachment configured to pivot about the pivot axis that is substantially perpendicular to the turning axis.

4. The robotic lawn mower of claim 1, wherein the combination linkage comprises a curved shape defining a C-shape or U-shape portion through which wheels of the second wheel assembly are enabled to pass when the second chassis platform turns about the turning axis.

5. The robotic lawn mower of claim 1, wherein the second coupling feature comprises the attachment configured to pivot about the pivot axis;
   wherein the combination linkage further comprises a pivot arm configured rotate about the turning axis when the second chassis platform turns about the turning axis,
   wherein the second link is disposed on the pivot arm.

6. The robotic lawn mower of claim 1, wherein the combination linkage is configured to enable a portion of a wheel of the second wheel assembly to pass under the combination linkage when the second chassis platform turns about the turning axis.

7. The robotic lawn mower of claim 1, wherein the combination linkage provides a limit to an amount of rotation the second wheel assembly is enabled to achieve when the second chassis platform turns about the turning axis.

8. The robotic lawn mower of claim 1, wherein the turning axis is defined at a turn assembly disposed at the second chassis platform, and wherein the turn assembly comprises a turning shaft forming a portion of the second link, the turning shaft being housed to enable rotation of the second chassis platform about the turning axis and pivoting about the pivot axis.

9. The robotic lawn mower of claim 8, wherein the turn assembly comprises a pivot bearing housing configured to house pivot bearings oriented to allow pivoting about the pivot axis +/−5 degrees and a turn bearing housing configured to house turn bearings disposed along the turning shaft to support rotational movement of the turning shaft of 360 degrees.

10. The robotic lawn mower of claim 1, wherein a wheelbase of the first wheel assembly is wider than a wheelbase of the second wheel assembly.

11. The robotic lawn mower of claim 1, further comprising
   processing circuitry configured to employ steering control for the robotic lawn mower,
   wherein the first wheel assembly comprises at least two wheels individually powered by corresponding drive motors of a first set of drive motors, and the second wheel assembly comprises at least two wheels individually powered by corresponding drive motors of a second set of drive motors.

12. The robotic lawn mower of claim 11, wherein an angle sensor is mounted proximate to the turning axis to monitor a turning angle of the second chassis platform relative to the first chassis platform, the angle sensor providing information indicative of the turning angle to the processing circuitry to enable the processing circuitry to employ the steering control based on the turning angle.

13. The robotic lawn mower of claim 12, wherein the processing circuitry is configured to employ the steering control by individually controlling a turning motor configured to control the turning angle responsive to input from the angle sensor.

14. The robotic lawn mower of claim 11, wherein the processing circuitry is configured to employ the steering control by individually controlling speed or direction of driving each respective wheel of the first and second wheel assemblies.

15. The robotic lawn mower of claim 1, comprising processing circuitry configured to employ steering control for the robotic lawn mower; and
    an angle sensor mounted proximate to the turning axis to monitor a turning angle of the second chassis platform relative to the first chassis platform, the angle sensor providing information indicative of the turning angle to the processing circuitry to enable the processing circuitry to employ the steering control based on the turning angle.

16. The robotic lawn mower of claim 1, comprising processing circuitry configured to employ steering control for the robotic lawn mower,
    wherein the processing circuitry is configured to monitor a turning angle formed between the first chassis platform and the second chassis platform and monitor an inclination of the robotic lawn mower to control the turning angle at least in part based on the inclination.

17. The robotic lawn mower of claim 16, wherein the processing circuitry is configured to limit the turning angle responsive to the inclination being greater than a predetermined amount.

18. A robotic vehicle comprising:
    a first chassis platform comprising a first wheel assembly;
    a second chassis platform comprising a second wheel assembly, the first and second chassis platforms being spaced apart from each other; and
    a combination linkage operably coupling the first and second chassis platforms,
    wherein the combination linkage is operably coupled to the first chassis platform via a first link and is operably coupled to the second chassis platform via a second link, and
    wherein the combination linkage employs at least two different coupling features to operably couple the first and second chassis platforms, the at least two different coupling features comprising at least any two among a fixed attachment, an attachment that enables rotation about a turning axis, and an attachment that enables pivoting about a pivot axis that is substantially perpendicular to the turning axis,
    wherein the combination linkage is configured to be under a portion of the combination linkage when the second chassis platform turns about the turning axis.

19. A robotic vehicle comprising:
    a first chassis platform comprising a first wheel assembly;
    a second chassis platform comprising a second wheel assembly, the first and second chassis platforms being spaced apart from each other; and
    a combination linkage operably coupling the first and second chassis platforms,
    wherein the combination linkage is operably coupled to the first chassis platform via a first link and is operably coupled to the second chassis platform via a second link, and
    wherein the combination linkage employs at least two different coupling features to operably couple the first and second chassis platforms, the at least two different coupling features comprising at least any two among a fixed attachment, an attachment that enables rotation about a turning axis, and an attachment that enables pivoting about a pivot axis that is substantially perpendicular to the turning axis,
    wherein the combination linkage is configured to enable a wheel of the second wheel assembly to pass between the first and second chassis platforms when the second chassis platform turns about the turning axis.

\* \* \* \* \*